(12) United States Patent　(10) Patent No.:　US 7,991,241 B2
Kusama　(45) Date of Patent:　Aug. 2, 2011

(54) IMAGE PROCESSING APPARATUS, CONTROL METHOD THEREFOR, AND PROGRAM

(75) Inventor: Kiyoshi Kusama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 12/054,842

(22) Filed: Mar. 25, 2008

(65) Prior Publication Data

US 2008/0246860 A1　Oct. 9, 2008

(30) Foreign Application Priority Data

Apr. 5, 2007　(JP) ................................. 2007-099746

(51) Int. Cl.
　　*G06K 9/40*　　(2006.01)
(52) U.S. Cl. ........................................ 382/254; 382/300
(58) Field of Classification Search .......... 382/254–275, 382/300
See application file for complete search history.

(56) References Cited

U.S. PATENT DOCUMENTS

| 4,933,983 | A * | 6/1990 | Hiramatsu et al. | 382/112 |
| 6,802,614 | B2 * | 10/2004 | Haldiman | 353/69 |
| 6,898,329 | B1 * | 5/2005 | Takahashi | 382/272 |
| 6,940,550 | B2 * | 9/2005 | Kitawaki et al. | 348/246 |
| 7,024,279 | B2 * | 4/2006 | Rose et al. | 700/245 |
| 7,119,926 | B2 * | 10/2006 | Takeda et al. | 358/1.9 |
| 7,161,602 | B2 * | 1/2007 | Shan | 345/606 |
| 7,206,461 | B2 * | 4/2007 | Steinberg et al. | 382/274 |
| 2003/0039402 | A1 | 2/2003 | Robins et al. | |

FOREIGN PATENT DOCUMENTS

| JP | 2001-223894 | 8/2001 |
| JP | 2004-222231 | 8/2004 |

OTHER PUBLICATIONS

Photoshop Restoration & Retouching: Tutorials, XP-002616622, pp. 1-5, Mar. 29, 2007.
The above references were cited in a Jan. 27, 2011 European Search Report a copy of which is enclosed of the counterpart European Patent Application No. 08154112.0.

* cited by examiner

*Primary Examiner* — Manav Seth
(74) *Attorney, Agent, or Firm* — Cowan, Liebowitz & Latman, P.C.

(57) ABSTRACT

An image processing apparatus corrects a shot image which is captured by an image capturing apparatus including an image sensor having a plurality of pixels arrayed two-dimensionally and on which a shadow of a foreign substance adhering to an optical element placed in front of the image sensor is captured. This apparatus includes an interpolation unit which performs interpolation processing of interpolating a signal of a pixel corresponding to the shadow of the foreign substance with a signal of a neighboring pixel, a designation unit which inputs an instruction to cause the interpolation unit to perform the interpolation processing, and a control unit which causes the interpolation unit to perform the interpolation processing, and when the interpolation unit has not performed the interpolation processing, causes the interpolation unit to re-execute the interpolation processing upon changing a parameter for the interpolation processing or an algorithm for the interpolation processing.

6 Claims, 23 Drawing Sheets

FIG. 4

| ADDRESS OFFSET (Hex) | CODE (Hex) | MEANING |
|---|---|---|
| +00 | | PROCESSING ID |
| +02 | | APPLICATION RANGE<br><br>RADIUS (TWO BYTES)<br><br>x-COORDINATE OF CENTER (TWO BYTES)<br><br>y-COORDINATE OF CENTER (TWO BYTES) |
| +08 | | RELATIVE POSITION FROM COPY SOURCE TO COPY DESTINATION<br><br>x DIRECTION (TWO BYTES)<br><br>y DIRECTION (TWO BYTES) |
| +06 | | POINTER TO DIFFERENCE IMAGE |

FIG. 10
INITIAL STATE
i
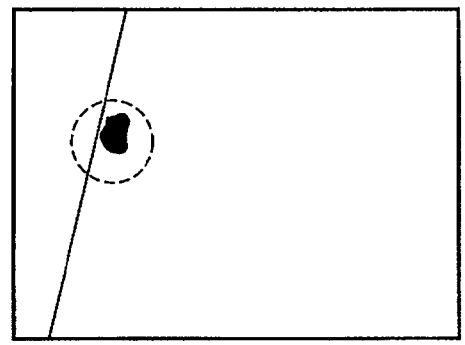
SIZE OF RADIUS IS CHANGED
ii
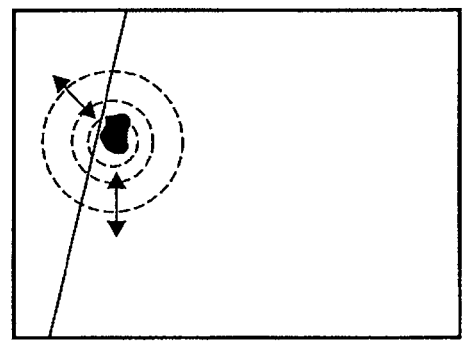
POSITION OF RADIUS IS CHANGED
iii
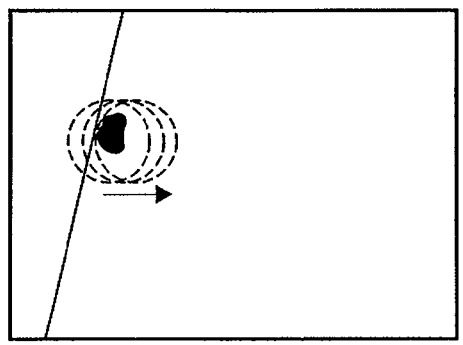
ALGORITHM IS CHANGED
iv
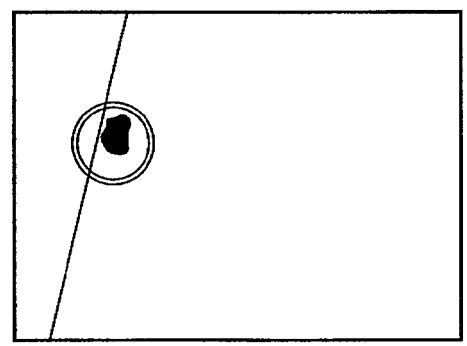

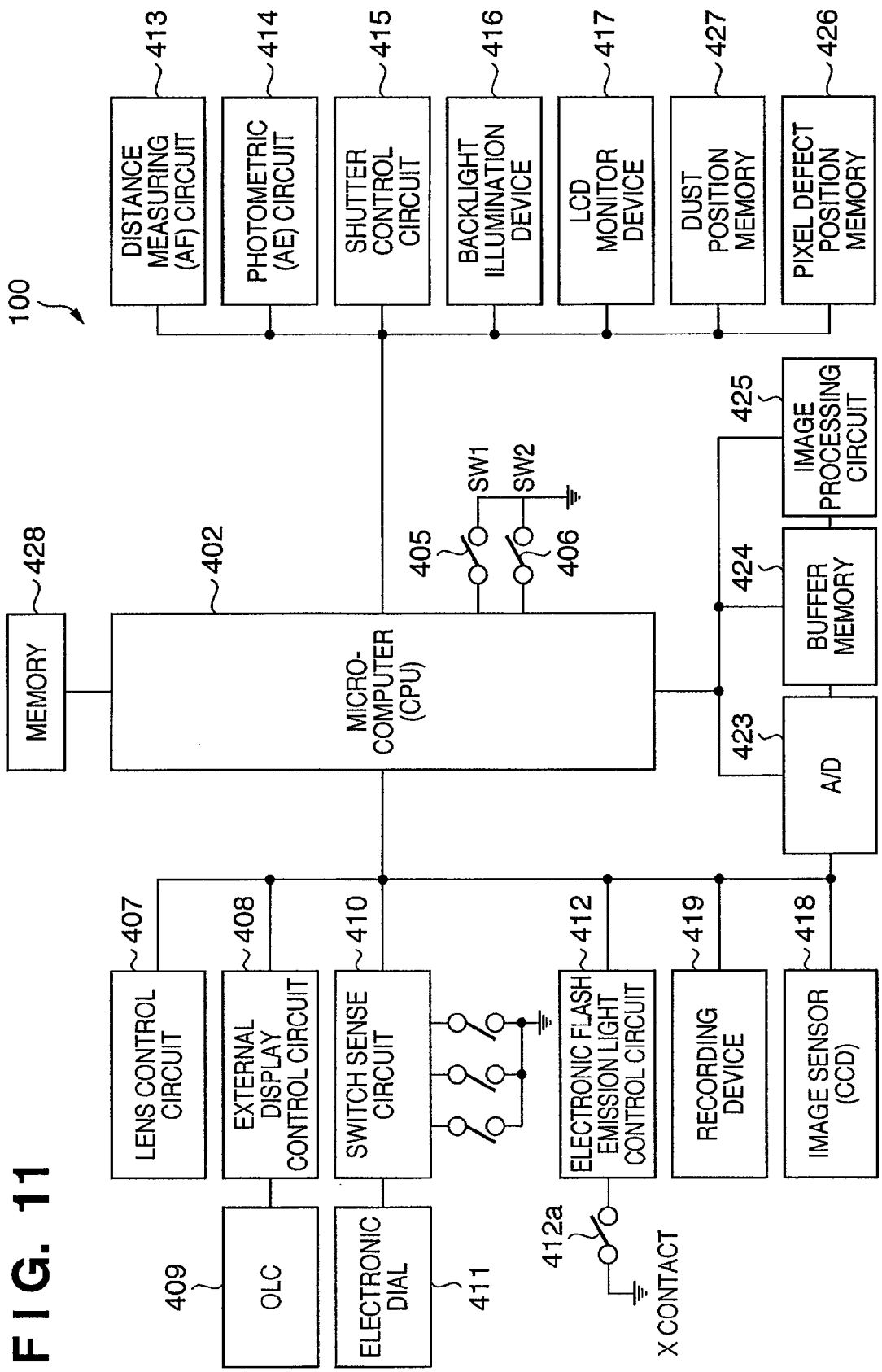
F I G. 11

FIG. 15

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST AREAS |
| +0C | | PARAMETERS FOR DUST AREA $D_1$<br>  RADIUS (TWO BYES)<br>   x-COORDINATE OF CENTER (TWO BYTES)<br>   y-COORDINATE OF CENTER (TWO BYTES) |
| | | PARAMETERS FOR DUST AREA $D_2$ |
| | | ... |
| | | PARAMETERS FOR DUST AREA $D_n$ |

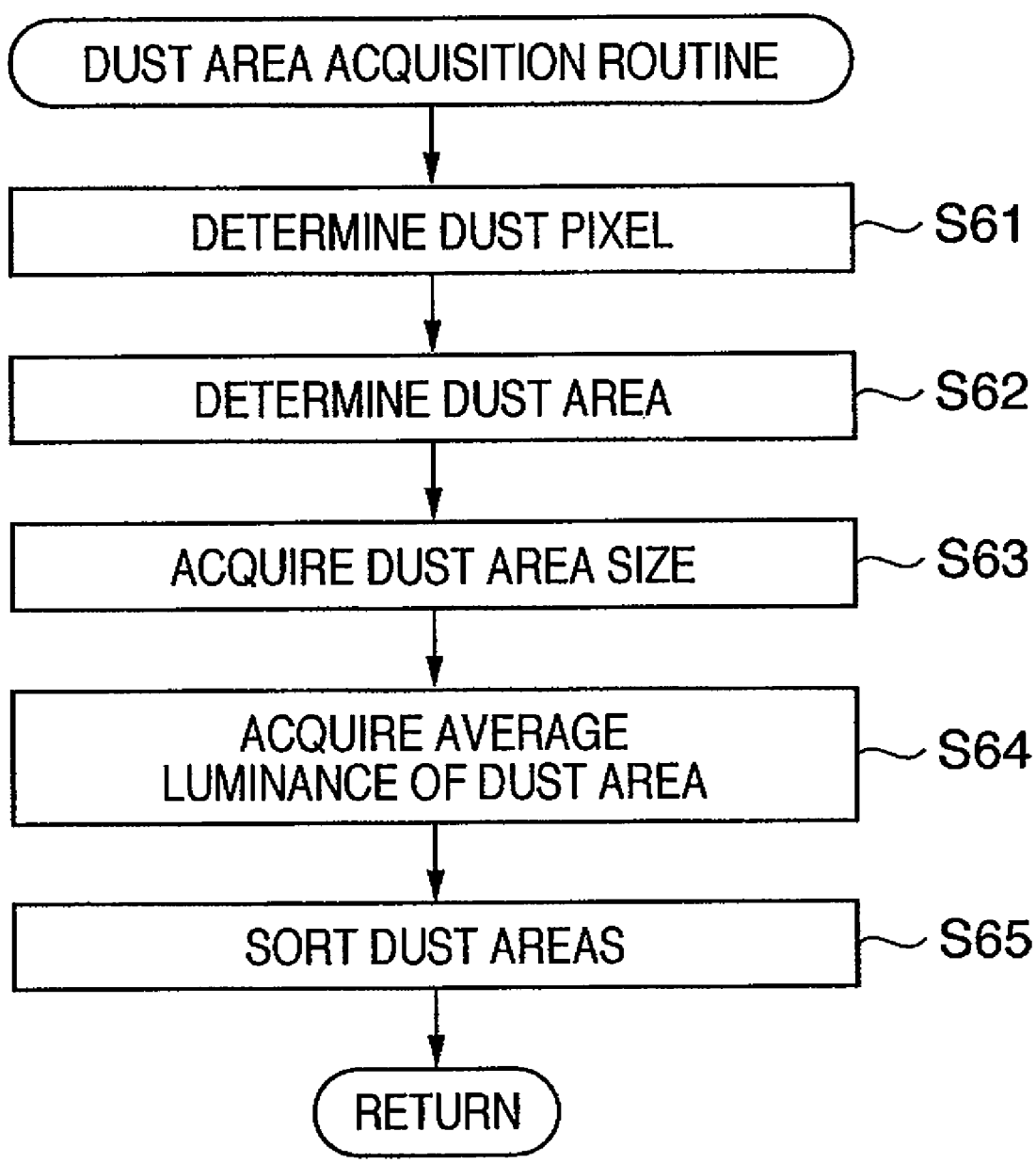
F I G. 16

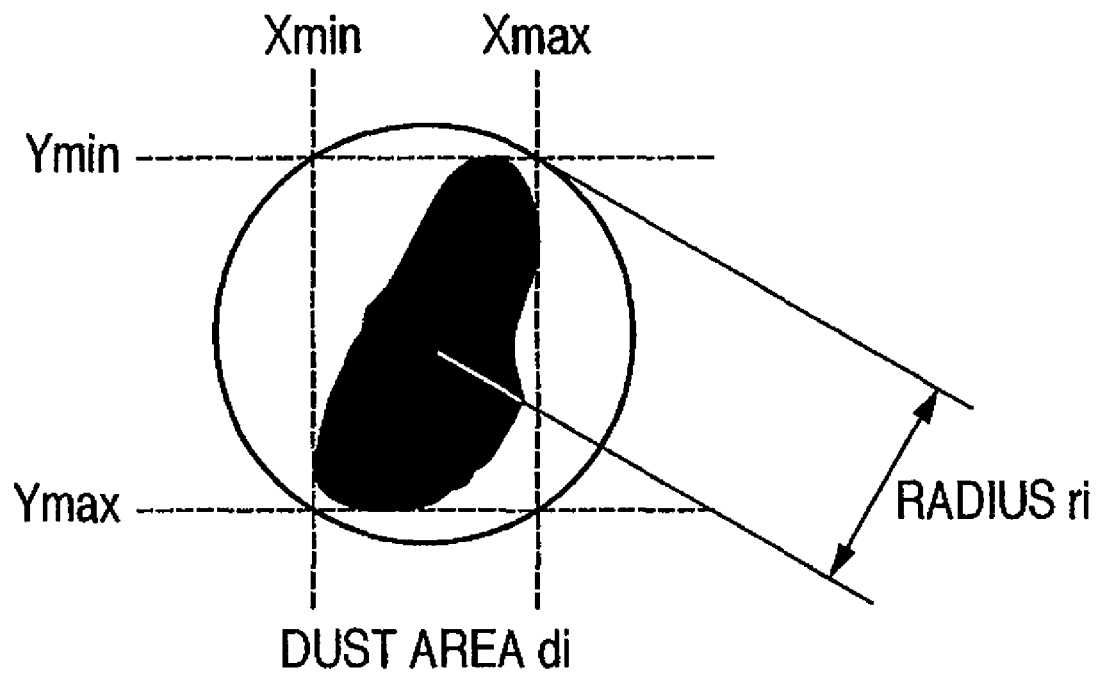
F I G. 18

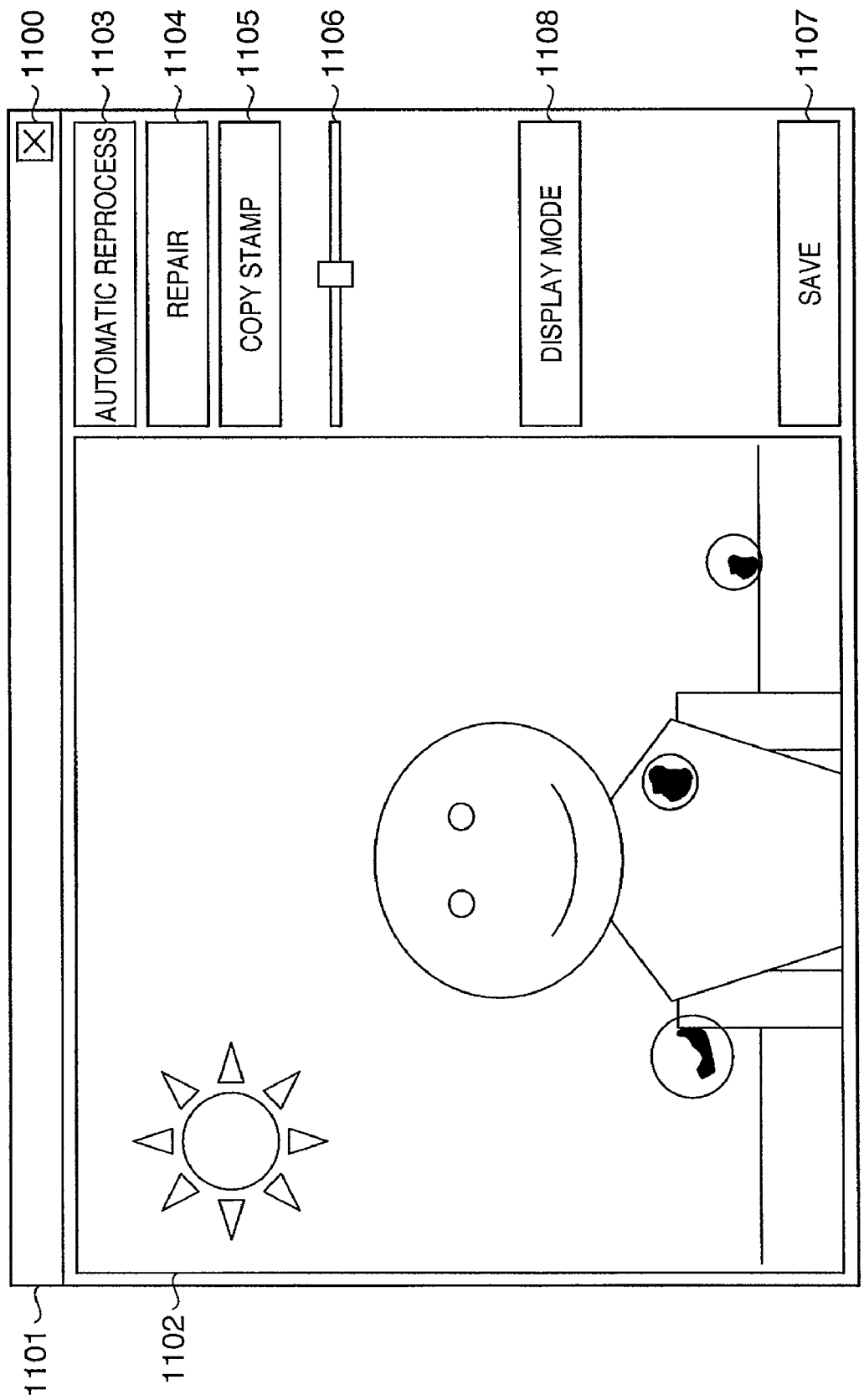

IMAGE PROCESSING APPARATUS, CONTROL METHOD THEREFOR, AND PROGRAM

BACKGROUND OF THE INVENTION

1. Field of the Invention

The present invention relates to a technique of correcting a portion of an image which is captured by an image capturing apparatus using an image sensor such as a CCD or CMOS sensor, the image quality of which has deteriorated due to a foreign substance adhering to an optical element placed in front of the image sensor.

2. Description of the Related Art

Recently, many image capturing apparatuses have appeared on the market which generate an image signal by using an image sensor such as a CCD, and record it as data, such as for example digital cameras and digital video cameras. A digital camera eliminates the necessity of a photosensitive film, which has been conventionally used as a recording medium, and records an image as data on a data recording medium such as a semiconductor memory card or a hard disk drive instead of such a film. These data recording media allow repetitive write and erase operations unlike films, and hence can reduce the consumable expenditure. Such media are therefore very useful.

In general, a digital camera is equipped with an LCD (Liquid Crystal Display) monitor capable of displaying captured images as needed, and a detachable large-capacity storage device.

Using a digital camera comprising these two devices can eliminate the necessity of a film, which is a recording medium conventionally used as a consumable, and allows the user to immediately check an image on the spot by displaying it on the LCD monitor device. It is therefore possible to erase any unsatisfactory image data on the spot or perform re-shooting as needed. That is, as compared with silver halide cameras using film, digital cameras have remarkably improved the efficiency of taking photographs.

Owing to such convenience and technical innovation such as an increase in the resolution of image sensors, the application range of digital cameras has been expanded. Recently, there have been available many lens interchangeable digital cameras such as single-lens reflex cameras.

In a digital camera, however, small particulates such as dust or motes (to be simply referred to as dust hereinafter) sometimes adhere to an image sensor protective glass fixed to an image sensor or the surface of an optical filter or the like (which will be generically referred to as an image sensor optical component hereinafter) placed in front of an image sensor. When dust adheres to an image sensor optical component in this manner, the dust blocks light. As a result, for example, the corresponding portion of the scene cannot be captured. That is, the quality of the captured image deteriorates.

In cameras using silver halide films as well as in digital cameras, dust on a film is also captured on an image. However, the film moves frame by frame, and hence similar dust is very rarely captured on all frames.

In contrast, the image sensor of the digital camera does not move, and the camera performs shooting using the same image sensor. For this reason, once dust adheres to an image sensor optical component, it is captured on many frames (shot images) in the same manner. A lens interchangeable digital camera, in particular, has a problem that dust tends to enter the camera when lenses are changed.

The user of the camera therefore must always take care about the adhesion of dust to an image sensor optical component, and spend much effort to check for dust and clean it off. Since an image sensor, in particular, is placed relatively deep inside the camera, it is not easy to clean or check for dust.

Dust easily enters a lens interchangeable digital camera when a lens is attached/detached. Furthermore, in many lens interchangeable digital cameras, a focal plane shutter is placed immediately before an image sensor, and hence dust easily adheres to an image sensor optical component.

Since such dust on an image sensor optical component generally adheres onto a protective glass or an optical filter instead of the surface of an image sensor, the dust is imaged in different states depending on the aperture value of a shooting lens or the distance from the pupil position of the lens. That is, as the aperture value approaches the open F-number, a shot dust image is blurred, and hence even the adhesion of small dust has almost no influence on the image. In contrast, as the aperture value increases, such dust is clearly imaged, and hence affects the image.

To solve this problem, for example, a user uses an image editing program to read an image in which dust is captured, designate an area including the dust, determine the presence/absence of the dust in the designated area, and execute interpolation processing (to be referred to as a repair process hereinafter), thereby removing the dust portion.

For the area designated by the user, however, the repair process described above executes no interpolation processing when no dust is detected or when dust is in contact with the designated area. This is because executing interpolation without appropriately detecting the dust area often results in an unnatural image. In this case, no processing is performed even if the user repeatedly designates the same area for repair.

Also, there is known a method of making dust less noticeable by preparing in advance an image of only dust on an image sensor, which is obtained by shooting a white wall or the like while the lens is set at a large aperture value, and using the image in combination with a general shot image (see Japanese Patent Laid-Open No. 2004-222231). This method, however, is cumbersome because the user must always be conscious of the correspondence between the image shot for dust detection and shot images to be associated with it. It is therefore conceivable to hold information indicating the position of dust, which is acquired by shooting a white wall or the like, and attaching the information indicating the position or size of dust to image data obtained by general shooting operation. For example, there is a method (automatic repair process) which uses a separately prepared image processing apparatus to analyze the dust position on the image data from the attached information of the position of dust and make the image of the dust less noticeable by interpolating the analyzed area with surrounding pixels.

In the automatic repair process described above, however, no interpolation processing of the automatic repair process is executed when it is determined that no dust exists or when the dust is in contact with the designated area. This is because, as in the repair process, executing interpolation without appropriately detecting the dust area often results in an unnatural image. That is, in this case, the automatic repair process cannot be performed for that area.

SUMMARY OF THE INVENTION

The present invention has been made in consideration of the above problem.

The present invention in its first aspect provides an image processing apparatus for correcting an image captured by an image capturing apparatus including an image sensor having a plurality of pixels arrayed two-dimensionally and on which a shadow of a foreign substance adhering to an optical element placed in front of the image sensor is captured, so as to reduce an influence of the shadow of the foreign substance, comprising an interpolation unit configured to interpolate a signal of a pixel corresponding to the shadow of the foreign substance on a captured image from a signal of a neighboring pixel outside the shadow of the foreign substance, a designation unit configured to input an instruction to cause the interpolation unit to perform the interpolation, and a control unit configured to control the interpolation unit to perform the interpolation in accordance with an instruction input from the designation unit, to accept a re-execution instruction input from the designation unit if the interpolation unit is unable to perform the interpolation, and to cause the interpolation unit to re-execute the interpolation with changing a parameter for the interpolation or an algorithm for the interpolation.

The present invention in its second aspect provides a method of controlling an image processing apparatus which corrects an image captured by an image capturing apparatus including an image sensor having a plurality of pixels arrayed two-dimensionally and on which a shadow of a foreign substance adhering to an optical element placed in front of the image sensor is captured, so as to reduce an influence of the shadow of the foreign substance, and includes interpolation unit configured to interpolate a signal of a pixel corresponding to the shadow of the foreign substance on a captured image from a signal of a neighboring pixel outside the shadow of the foreign substance, and designation unit configured to input an instruction to cause the interpolation unit to perform the interpolation, the method comprising a step of causing the interpolation unit to perform the interpolation in accordance with an instruction input from the designation unit, accepting re-execution instruction input from the designation unit if the interpolation unit is unable to perform the interpolation, and causing the interpolation unit, upon acceptance of the re-execution instruction, to re-execute the interpolation with changing a parameter for the interpolation or an algorithm for the interpolation.

Further features of the present invention will become apparent from the following description of exemplary embodiments with reference to the attached drawings.

BRIEF DESCRIPTION OF THE DRAWINGS

FIG. 4 is a view showing the data structure of the editing history of an image editing program;

FIG. 10 is a view showing an example of a user interface which indicates the process of reprocessing after a repair process in the first embodiment;

FIG. 11 is a block diagram showing the circuit arrangement of a lens interchangeable single-lens reflex digital camera as an image capturing apparatus according to the second embodiment of the present invention;

FIG. 15 is a view showing an example of the data format of dust correction data;

FIG. 16 is a flowchart for explaining details of a dust area acquisition routine in step S27 in FIG. 14;

FIG. 18 is a view showing an outline of dust area size calculation in step S63 in FIG. 16;

FIG. 23 is a view showing an example of a user interface indicating the process of reprocessing after the automatic repair process.

DESCRIPTION OF THE EMBODIMENTS

The preferred embodiments of the present invention will be described in detail below with reference to the accompanying drawings.

First Embodiment

When an object is photographed by a digital camera, the shadow of a foreign substance (dust) such as dust or mote adhering to the surface of an optical element, e.g., an optical low-pass filter, placed in front of an image sensor comprising a two-dimensional array of pixels, is captured on the object image. This embodiment transfers the image data, in which the shadow of the dust is captured, to an image processing apparatus outside the camera, detects the position of the dust in the image data in the image processing apparatus, and performs dust removal processing (the processing of reducing the influence of the shadow of the dust on image quality). The embodiment also performs reprocessing when dust removal processing fails.

(Dust Removal Processing)

The procedure of dust removal processing will now be described. Dust removal processing is performed not in the camera body but on a separately prepared image processing apparatus.

Figure 1:
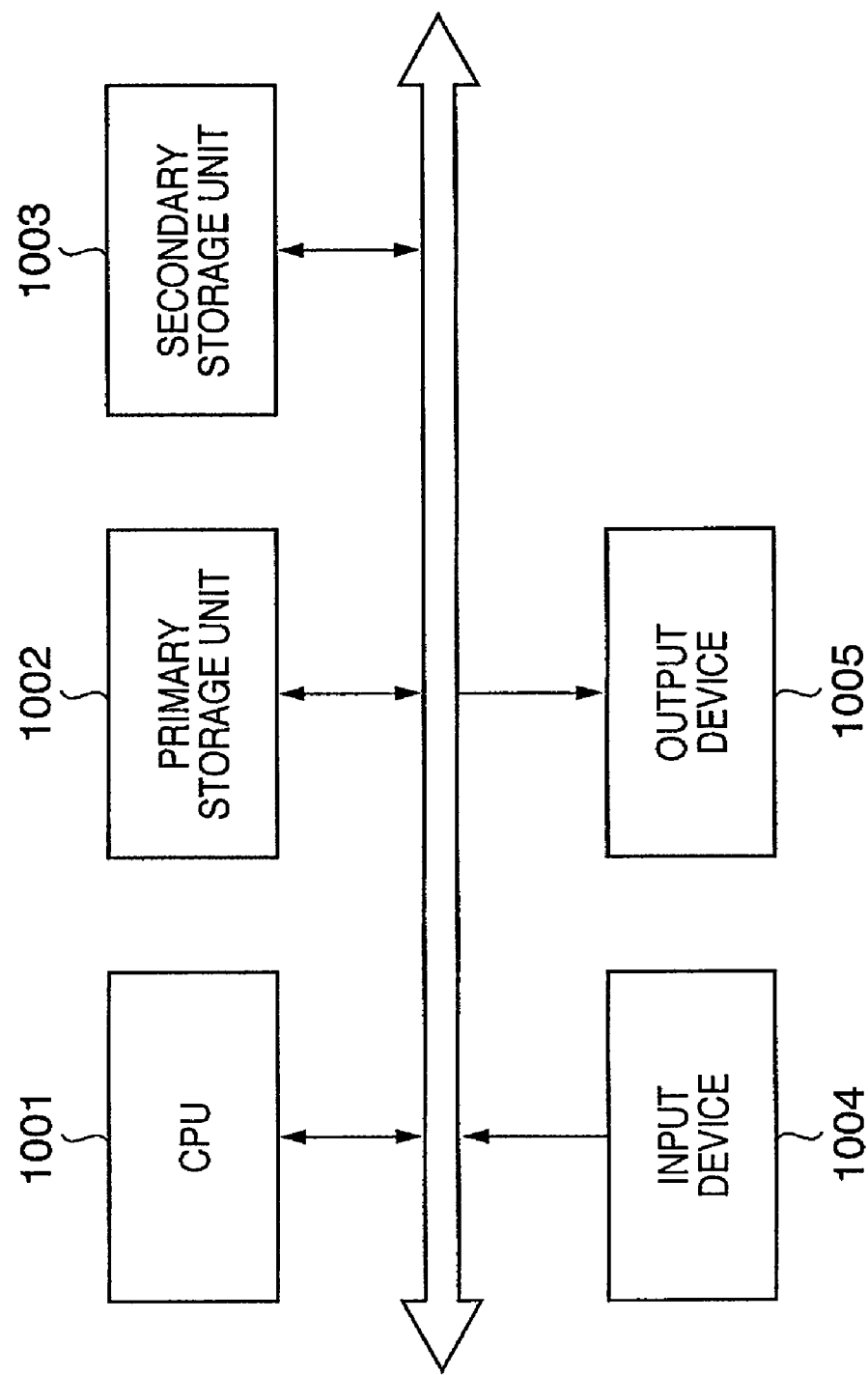
FIG. 1 is a block diagram schematically showing the system configuration of an image processing apparatus.

FIG. 1 schematically shows the system configuration of the image processing apparatus.

A CPU 1001 controls the overall operation of the system and executes, for example, a program stored in a primary storage unit 1002. The primary storage unit 1002 mainly includes a memory, which reads out a program from a secondary storage unit 1003 and stores it. The secondary storage unit 1003 corresponds to, for example, a hard disk. The capacity of the primary storage unit is generally smaller than that of the secondary storage unit. The secondary storage unit stores programs and data with a size beyond the capacity of the primary storage unit. The secondary storage unit 1003 also stores data that need to be stored for a long period of time. In this embodiment, the secondary storage unit 1003 stores a program. When executing the program, the CPU 1001 loads the program in the primary storage unit 1002 and executes it.

An input device 1004 corresponds to, for example, not only a mouse and keyboard used for system control but also a card reader, scanner, and film scanner necessary for inputting image data. Examples of an output device 1005 are a monitor and a printer. This apparatus can take various forms, and repetitive description will be omitted in the following description where possible.

The image processing apparatus has an operating system capable of executing a plurality of programs in parallel. The operator can operate a program running on this apparatus by using a GUI (Graphical User Interface).

The image processing apparatus in this embodiment can execute two processes as image editing functions. One is a copy stamp process, and the other is a repair process. The copy stamp process is a function of combining some of the areas on a designated image with another area which is separately designated. The repair process is a function of detecting an isolated area in the designated image which matches a predetermined condition, and interpolating the pixel data in the isolated area with the data from neighboring pixels.

Figure 2:
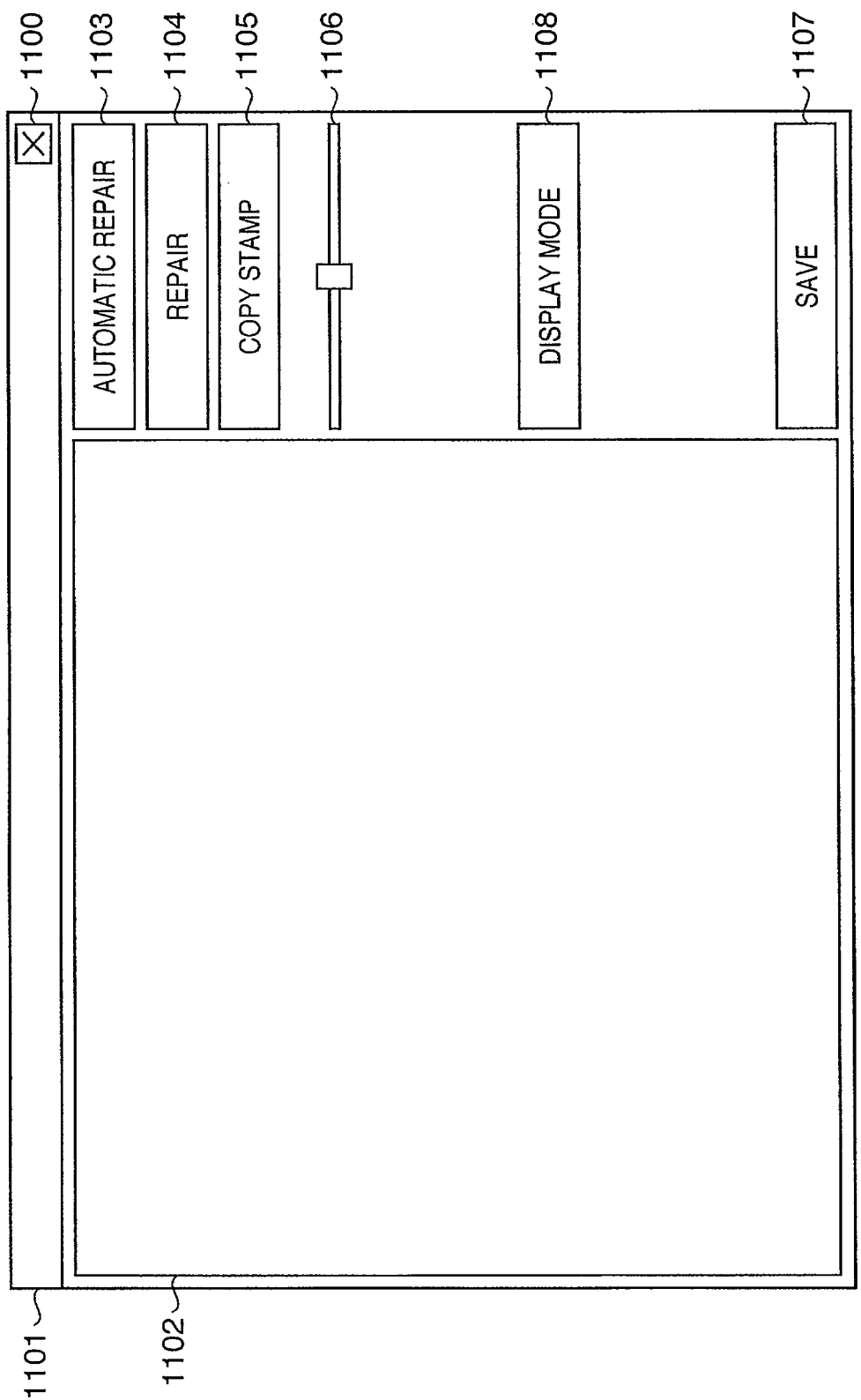
FIG. 2 is a view showing an example of a GUI in the image processing apparatus.

FIG. 2 is a view showing a GUI (Graphical User Interface) of an image editing program in the image processing apparatus. A window has a close button 1100 and a title bar 1101. When the user presses the close button 1100, the program ends. A file is dragged and dropped into an image display area 1102 to designate a correction target image. When the correction target image is determined, the file name is displayed in the title bar 1101, and the target image is displayed to fit in the image display area 1102.

The editing target image is displayed in two states, i.e., a Fit-displayed state and a pixel one-to-one displayed state. Operating a display mode button 1108 can switch between these displayed states. According to this GUI, a process position is designated by clicking on an image. In the Fit displayed state, coordinates on a processed image which correspond to a clicked position are calculated in accordance with a display magnification, and the process is applied to the calculated coordinates. According to this GUI, a processing range is designated with a radius. This radius is one on the editing target image, and sometimes differs from a radius on a Fit-displayed image depending on the display magnification.

A radius slider 1106 is a slider which designates application ranges for a copy stamp process and a repair process.

When the user presses a repair process mode button 1104, the repair process starts. When the user left-clicks a portion in the image in the repair process mode, a repair process (to be described later) is applied to an area having the left-clicked coordinates as a center and the number of pixels designated by the radius slider 1106 as a radius. After the application of the repair process, the process leaves the repair process mode. When the user right-clicks on the image display area 1102 in the repair mode or presses any button on the GUI, the process leaves the repair mode.

When the user presses a copy stamp process mode button 1105, the copy stamp mode starts. When the user left-clicks a portion in an image in the copy stamp mode, the left-clicked coordinates are set as the central coordinates of a copy source area. When the user further left-clicks on the image while the central coordinates of the copy source area are set, a copy stamp process is executed with the left-clicked coordinates being the central coordinates of the copy destination area and the radius designated by the radius slider 1106 at this time being a copy radius. The process then leaves the copy stamp mode while the central coordinates of a copy source area are kept unset. When the user right-clicks on the image display area 1102 in the copy stamp mode or presses any button on the GUI, the process leaves the copy stamp mode while the central coordinates of the copy source area are kept unset.

When the user presses a save button 1107, the processed image is saved.

Figure 3:
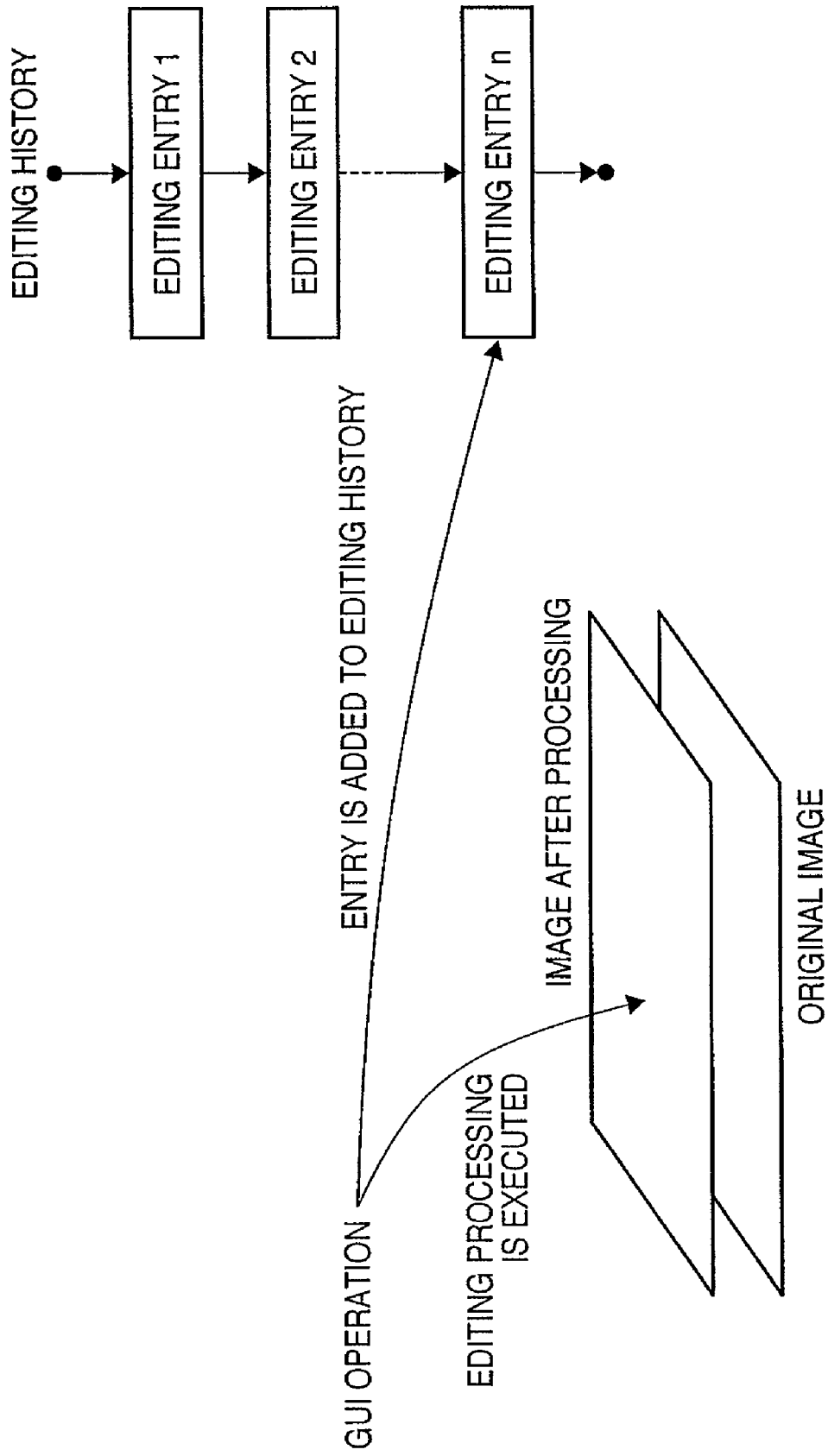
FIG. 3 is a view showing the internal structure of an image editing program.

The image editing program of this embodiment holds both a source image and an image after processing, as shown in FIG. 3. The editing process designated by the GUI is applied to the processed image, and the applied editing process is registered in an editing history. One editing process registered in the editing history will be referred to as an editing entry. FIG. 4 shows an example of an editing entry. An editing entry in this embodiment holds a process ID for discriminating a copy stamp process from a repair process, a center and radius which indicate a process application area, relative coordinates from copy source coordinates to copy destination coordinates which are necessary for a copy stamp process, and difference image data to be described later.

Such implementation makes it possible to reconstruct a source image upon completely discarding an editing history or cancel an immediately preceding editing process.

For example, it is possible to implement the processing of canceling an immediately preceding editing process by temporarily overwriting a processed image with a source image and then re-executing the editing process up to an editing entry as a cancellation target. If, however, the number of entries is very large, it may take much time to re-execute the editing process. For this reason, every time an editing operation is executed, the difference between image data before and after the execution of an editing process is held in an editing entry. Holding a difference image allows to only reflect the difference image corresponding to the editing entry as a cancellation target in place of the re-execution of the editing process written in an editing entry from the beginning.

The details of a repair process will be described next. A copy stamp process is a known technique, and hence a detailed description of this process will be omitted.

A repair process is the processing of detecting an isolated area in designated areas and interpolating the isolated area. The repair process is implemented by applying an interpolation routine (to be described later) to the area expressed by the central coordinates and radius designated by a user with the GUI.

(Interpolation Routine)

An interpolation routine executed in a repair process will be described below.

Figure 5:
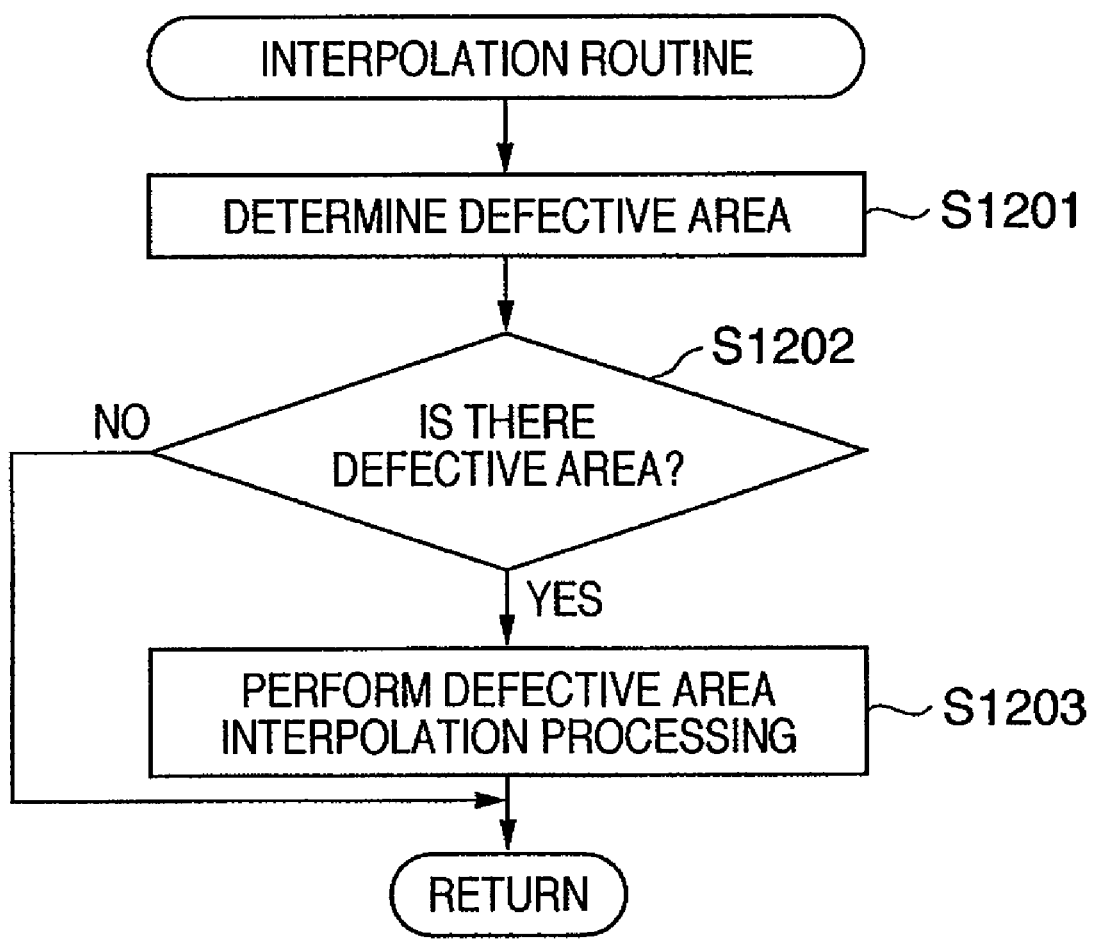
FIG. 5 is a flowchart for explaining the details of an interpolation routine.

FIG. 5 is a flowchart showing the procedure of the interpolation routine.

First of all, in step S1201, dust area (an area in which the shadow of dust is captured, that is to be referred to as a defective area) is determined. In this case, let P be the central coordinates of an area as a repair process target, and R be the radius of the area. A dust area is an area that satisfies all the following conditions.

(1) An area having a luminance lower than a threshold value T2 which is obtained by $$T2=Yave \times 0.6+Ymax \times 0.4$$

where Yave is the average luminance of pixels included in a repair process target area, and Ymax is the maximum luminance of the pixels.

(2) An area that does not contact the circle represented by the central coordinates P and the radius R.

(3) An area whose radius value calculated by the same method as that in step S63 in FIG. 16 is x pixels or more and less than y pixels in the isolated area constituted by low-luminance pixels selected in (1). Step S63 in FIG. 16 will be described later.

In this embodiment, x is three pixels, and y is 30 pixels. This permits only an isolated small area to be handled as a dust area.

If it is determined in step S1202 that such an area exists, the process advances to step S1203 to execute dust area interpolation. If no area exists, the processing is terminated.

The dust area interpolation processing in step S1203 is executed by a known defective area interpolation method. An example of the known defective area interpolation method is pattern replacement disclosed in Japanese Patent Laid-Open No. 2001-223894. The method disclosed in Japanese Patent Laid-Open No. 2001-223894 specifies a defective area by using infrared light. In this embodiment, the dust area detected in step S1201 is handled as a defective area, and pattern replacement is executed to interpolate the dust area from normal neighboring pixels. A pixel that cannot be compensated for by pattern replacement is interpolated by selecting p normal pixels in ascending order of distance from the interpolation target pixel in the image data interpolated by pattern replacement and q normal pixels in descending order of distance, and using the average color of the selected pixels.

Figure 6:
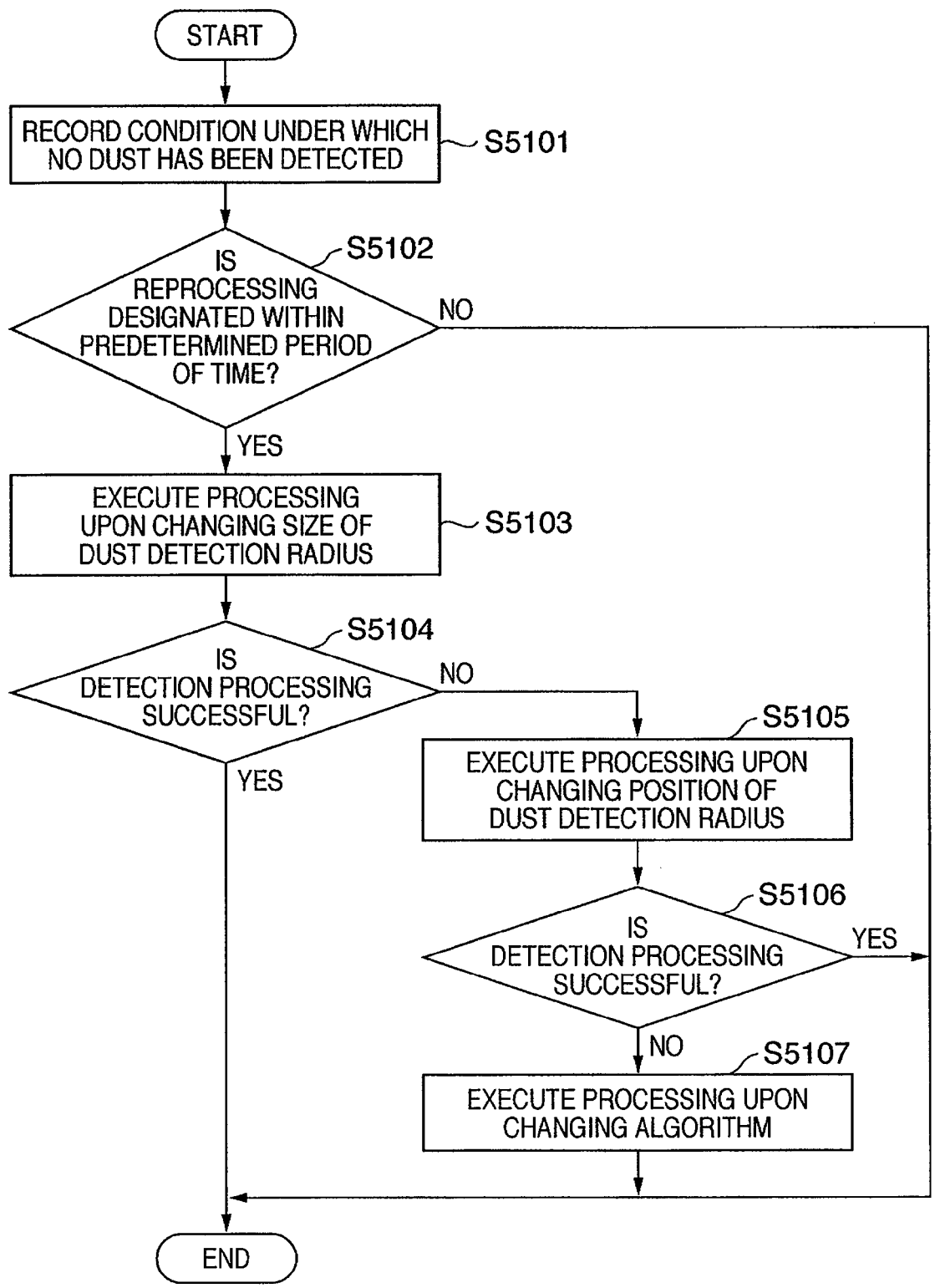
FIG. 6 is a flowchart showing a reprocessing sequence to be executed when no dust is detected in the first embodiment.

FIG. 6 shows a processing sequence to be executed when it is determined in step S1202 that no dust area is present.

In step S5101, the conditions under which no isolated area is present, i.e., no dust has been detected, are recorded.

In this case, the conditions under which no isolated area is present include the following:

(1) Dust is in contact with the circle represented by the central coordinates P and the radius R.

(2) There is no area darker than the threshold value T2 within the radius R.

The conditions under which dust has been detected include, for example, the number of dust areas. These conditions are recorded.

If it is determined in step S5102 that the user has designated reprocessing for an area at the same position within a predetermined period of time (e.g., two sec), for example, that the user has clicked the same place, the following processing is performed. That is, it is determined that no dust area has been detected but the user eagerly wants to remove dust located at the position, and the process advances to step S5103.

If the user has not designated reprocessing, the processing is terminated.

In step S5103, the size of the dust detection radius is changed, and processing is executed. A method of changing the dust detection radius will be described later.

If it is determined in step S5104 that the dust detection processing is successful, the processing is terminated. If the detection processing fails, the process advances to step S5105 to execute the processing upon changing the central position of the dust detection radius.

A method of changing the central position of the dust detection radius will be described later.

If it is determined in step S5106 that the detection processing is successful, the processing is terminated.

If the detection processing fails, the process advances to step S5107.

In step S5107, the dust detection algorithm is changed, and a given position in the dust detection area is detected as a dust position.

A method of changing the dust detection algorithm will be described later.

Figure 7:
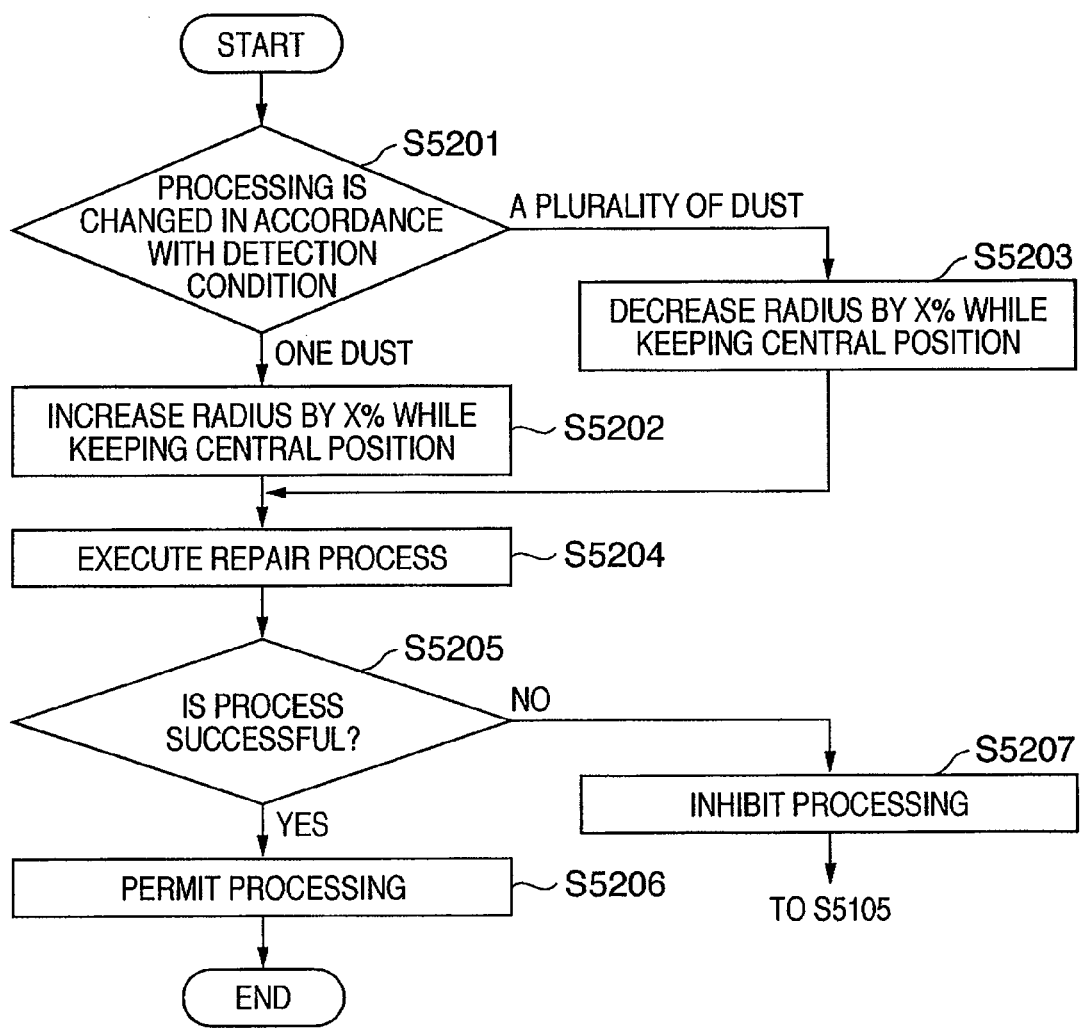
FIG. 7 is a flowchart showing a processing sequence for changing the size of a dust detection radius in the first embodiment.

A method of changing the dust detection radius will now be described next with reference to FIG. 7.

In step S5201, the processing of changing the dust detection radius is changed in accordance with detection conditions (1) and (2) described above.

That is, if one dust particle is present in contact with the dust detection radius, the process advances to step S5202 to increase the dust detection radius.

If a plurality of dust particles are present in contact with the dust detection radius, the process advances to step S5203 to decrease the dust detection radius.

In step S5204, a repair process is executed. If it is determined in step S5205 that the repair process is successful, the process advances to step S5206. The processing is then terminated.

If the repair process fails, the process advances to step S5207, and the position of the dust detection radius is changed in step S5105 in FIG. 6.

The method of changing the central position of the dust detection radius will be described with reference to FIG. 8.

In step S5301, the central position of the dust detection radius is changed in accordance with detection conditions (1) and (2) described above.

That is, if a plurality of dust particles are present in contact with the dust detection radius, the process advances to step S5302 to move the central position of the dust detection radius in the direction in which no dust is in contact with the radius, i.e., the uniformity is high. If one dust particle is present in contact with the radius, the process advances to step S5303 to move the central position in the direction in which the dust is in contact with the radius, i.e., the luminance change is large.

In step S5304, a repair process is executed. If it is determined in step S5305 that the repair process is successful, the process advances to step S5306, and the processing is terminated.

According to the above technique, it can be said that at least one of the position of the dust detection radius and the central position of the dust detection radius is changed.

If the repair process fails, the process advances to step S5307, and the dust detection algorithm is changed in step S5107 in FIG. 6.

The method of changing the dust detection algorithm will now be described with reference to FIG. 9.

In step S5401, it is determined that dust is present at the central position arbitrarily designated by the user. In contrast to step S1201 in which the position of dust is calculated from an average luminance, in this step, the dust area is determined by using an area enlargement technique, and a repair process is applied to the area. In this case, the area enlargement technique is a technique of determining whether a pixel adjacent to a designated seed pixel belongs to the inside of the area. More specifically, a pixel at the central position designated by the user is set as the seed pixel, and a pixel which is adjacent to the seed pixel and has information falling within a predetermined range relative to the information of the seed pixel, e.g., the luminance information or color information of the seed pixel, is defined as a pixel within the area. This technique further searches for a pixel adjacent to the pixel defined as the pixel within the area. The technique repeats this processing to enlarge the area. When all the adjacent pixels become pixels having information outside a predetermined range, all the pixels located inside the area are determined. The internal area determined in this manner is set as a dust area, and a repair process is applied to this area.

With the above method, even dust for which detection has failed can be removed by performing a repair process by changing the parameters and the algorithm in accordance with an instruction form the user.

When changing the dust detection radius, the central position of the dust detection radius, or the algorithm in this manner, the apparatus displays, on the screen, information indicating that the position or size of the dust detection radius designated by the user will change, as shown in FIG. 10. The apparatus then notifies the user of the process of automatic processing.

In this embodiment, when detection fails after the size of the dust detection radius is changed first, the central position of the dust detection radius is changed. Lastly, the processing algorithm is changed, and processing is performed. However, the size and position of the dust detection radius can be changed in the reverse order to the above, as an alternative.

In this embodiment, the size of the dust detection radius is changed only once. However, when the size and central position of the dust detection radius are to be changed, the size and central position of the dust detection radius can be determined by repeating the processing several times. In this case, the processing is repeated within the range set by determining the number of times of repetitions, the minimum and maximum values of the dust detection radius, the maximum movement amount, or the like.

As a further alternative, it is possible to randomly change the size and central position of the dust detection radius. In this case, the processing is repeated within the range set by determining the number of times of repetitions, or the like.

Second Embodiment

The first embodiment has exemplified a case in which dust detection processing and dust removal processing are performed by transferring image data, in which dust is captured, to an image processing apparatus outside a camera. The first embodiment has also described reprocessing to be performed when dust removal processing fails.

In the second embodiment, a case will be described in which a camera body detects dust and attaches dust correction data to image data, and then an image processing apparatus outside the camera performs dust removal processing for the image data by using the dust correction data attached to the image data. This embodiment also describes reprocessing to be performed when dust removal processing fails.

FIG. 11 is a block diagram showing the circuit arrangement of a lens interchangeable single-lens reflex digital camera according to the second embodiment of the present invention.

Referring to FIG. 11, a microcomputer 402 performs control on the overall operation of the camera, including control on processing for image data output from an image sensor (a CCD in this embodiment) 418 and display control on an LCD monitor device 417.

When the user half-presses a release button 112 (see FIG. 12), a switch (SW1) 405 is turned on. When the switch (SW1) 405 is turned on, the digital camera of this embodiment is ready for shooting. When the user presses the release button 112 to the second stroke position (in a fully pressed state), a switch (SW2) 406 is turned on. When the switch (SW2) 406 is turned on, the digital camera of this embodiment starts shooting operation.

A lens control circuit 407 performs driving control on a shooting lens 200 (see FIG. 13) and the aperture blade at the time of communication with the shooting lens 200 and AF (Auto Focus) operation.

Referring to FIG. 11, an external display control circuit 408 controls an external display device (OLC) 409 and a display device (not shown) in the viewfinder. A switch sense circuit 410 transmits signals from many switches including an electronic dial 411 provided in the camera to the microcomputer 402.

An electronic flash emission light control circuit 412 is grounded via an X contact 412a and controls an external electronic flash. A focus measuring circuit 413 detects the defocus amount of an object for AF operation. A photometric circuit 414 measures the luminance of the object.

A shutter control circuit 415 controls the shutter to perform correct exposure for the image sensor 418. The LCD monitor device 417 and a backlight illumination device 416 constitute an image display device. A recording device 419 is, for example, a hard disk drive or semiconductor memory card which is detachable from the camera body.

An A/D converter 423, an image buffer memory 424, an image processing circuit 425 comprising a DSP and the like, and a pixel defect position memory 426 storing information indicating that a predetermined pixel itself in the image sensor is defective are connected to the microcomputer 402. A dust position memory 427 (storing a pixel position in the image sensor at which an image defect is caused by dust) is also connected to the microcomputer 402. Note that nonvolatile memories are preferably used as the pixel defect position memory 426 and the dust position memory 427. The pixel defect position memory 426 and the dust position memory 427 can store information by using different addresses within the same memory space.

A nonvolatile memory (428) stores programs and the like executed by the microcomputer 402.

Figure 12:
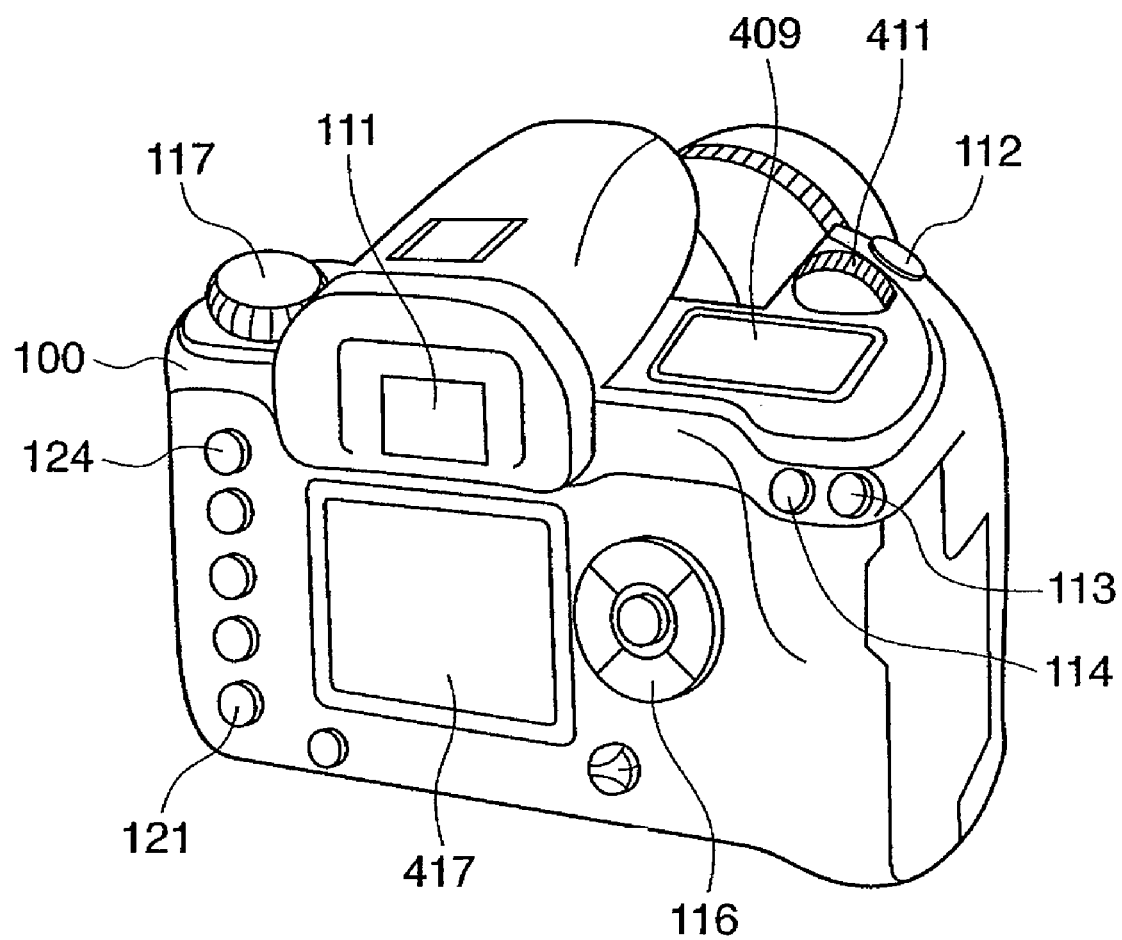
FIG. 12 is a perspective view showing the outer appearance of the digital camera according to the second embodiment.
Figure 13:
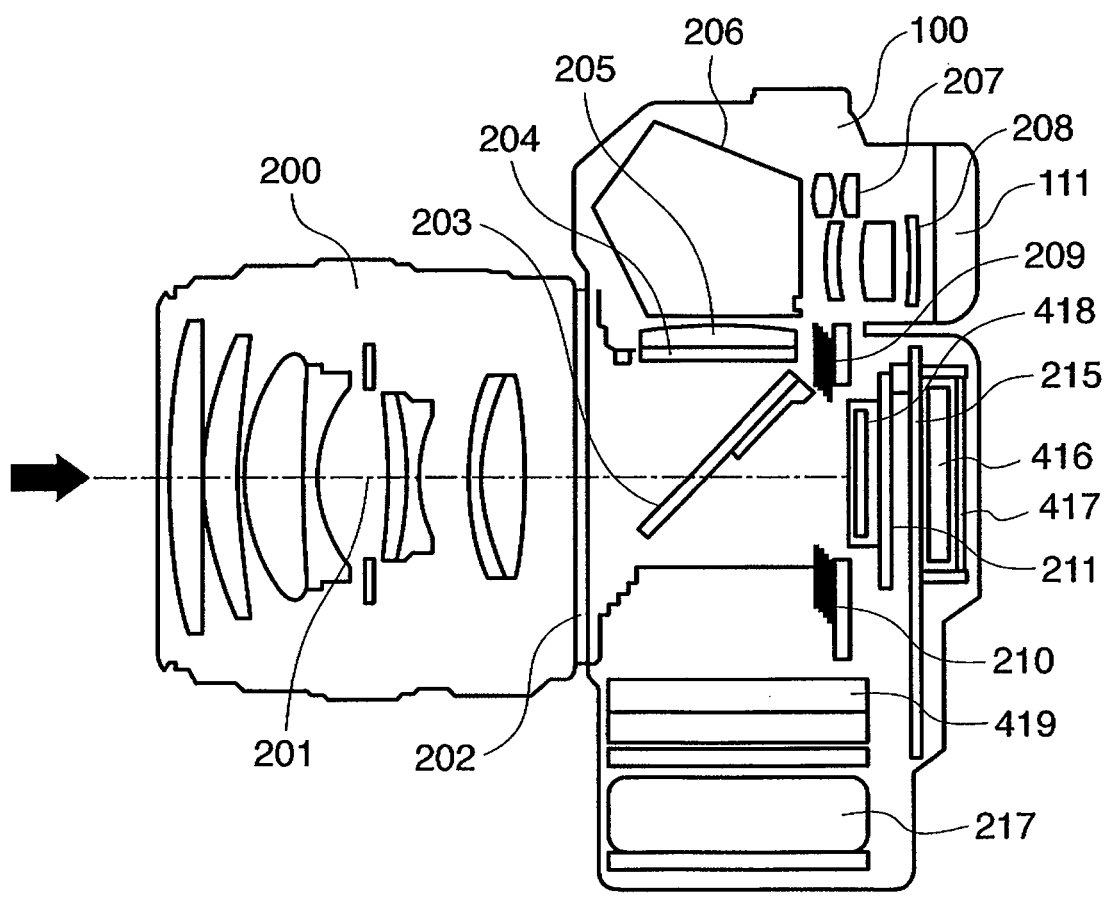
FIG. 13 is a vertical sectional view showing the internal structure of the digital camera according to the second embodiment.

FIG. 12 is a perspective view showing the outer appearance of the digital camera according to this embodiment. FIG. 13 is a vertical sectional view of the camera shown in FIG. 12.

Referring to FIG. 12, an eyepiece window 111 for viewfinder observation, an AE (Auto Exposure) lock button 114, an AF focus measuring position selection button 113, and the release button 112 for shooting operation are provided on the upper portion of a camera body 100. The electronic dial 411, a shooting mode selection dial 117, and the external display device 409 are also provided on the upper portion of the camera body 100. The electronic dial 411 is a multifunctional signal input device for inputting numerical values to the camera and switching the shooting modes in combination with other operation buttons. The external display device 409 comprises a liquid display device, and displays shooting conditions such as a shutter speed, aperture value, and shooting mode, and other information.

The LCD monitor device 417 which displays shot images, various setting windows, and the like, a monitor switch 121 for turning on/off the LCD monitor device 417, a cross switch 116, and a menu button 124 are provided on the rear surface of the camera body 100.

The cross switch 116 includes four buttons arranged vertically and horizontally and a SET button placed in the center. The user uses the cross switch 116 to issue, to the camera, an instruction to select or execute a menu item displayed on the LCD monitor device 417.

The menu button 124 is a button for causing the LCD monitor device 417 to display a menu window for making various settings for the camera. When selecting and setting a shooting mode, the user selects a desired mode by operating the up, down, left, and right buttons of the cross switch 116 upon pressing the menu button 124, and then presses the SET button while the desired mode is selected, thus completing the setting. The menu button 124 and the cross switch 116 are also used to set a dust detection mode to perform dust detection processing (to be described later), a display mode in the dust detection mode, and an identification mark.

Since the LCD monitor device 417 in this embodiment is of the transmission type, the device does not allow the user to visually check an image by only driving the LCD monitor device, and requires the backlight illumination device 416 on the rear surface, as shown in FIG. 13. The LCD monitor device 417 and the backlight illumination device 416 constitute an image display device.

As shown in FIG. 13, the shooting lens 200 as a part of the shooting optical system is detachable from the camera body 100 via a lens mount 202. Referring to FIG. 13, reference numeral 201 denotes a shooting optical axis; and 203, a quick return mirror.

The quick return mirror 203 is placed in the shooting optical path, and can move between a position at which it guides object light from the shooting lens 200 to the viewfinder optical system (the position shown in FIG. 13 which will be referred to as a tilt position) and a position (to be referred to as a retreat position) at which the mirror is removed from the shooting optical path.

Referring to FIG. 13, object light guided from the quick return mirror 203 onto the viewfinder optical system is formed into an image on a focusing screen 204. Reference numeral 205 denotes a condenser lens for improving the visibility of the viewfinder; and 206, a pentagonal roof prism which guides object light passing through the focusing screen 204 and the condenser lens 205 to an eyepiece lens 208 for viewfinder observation and a photometric sensor 207.

Reference numerals 209 and 210 respectively denote rear and front curtains constituting a shutter. Opening the rear curtain 209 and the front curtain 210 will expose the image sensor 418, which is a solid-stage image sensor placed behind them, with light for a necessary period of time. A shot image converted into an electrical signal for each pixel by the image sensor is processed by the A/D converter 423, image processing circuit 425, and the like. The resultant data is recorded as image data on the recording device 419.

The image sensor 418 is held on a printed circuit board 211. A display board 215 which is another printed circuit board is placed behind the printed circuit board 211. The LCD monitor device 417 and the backlight illumination device 416 are arranged on the opposite side of the display board 215.

Reference numeral 419 denotes the recording device which records image data; and 217, a battery (portable power supply). The recording device 419 and the battery 217 are detachable from the camera body.

(Dust Detection Processing)

Figure 14:
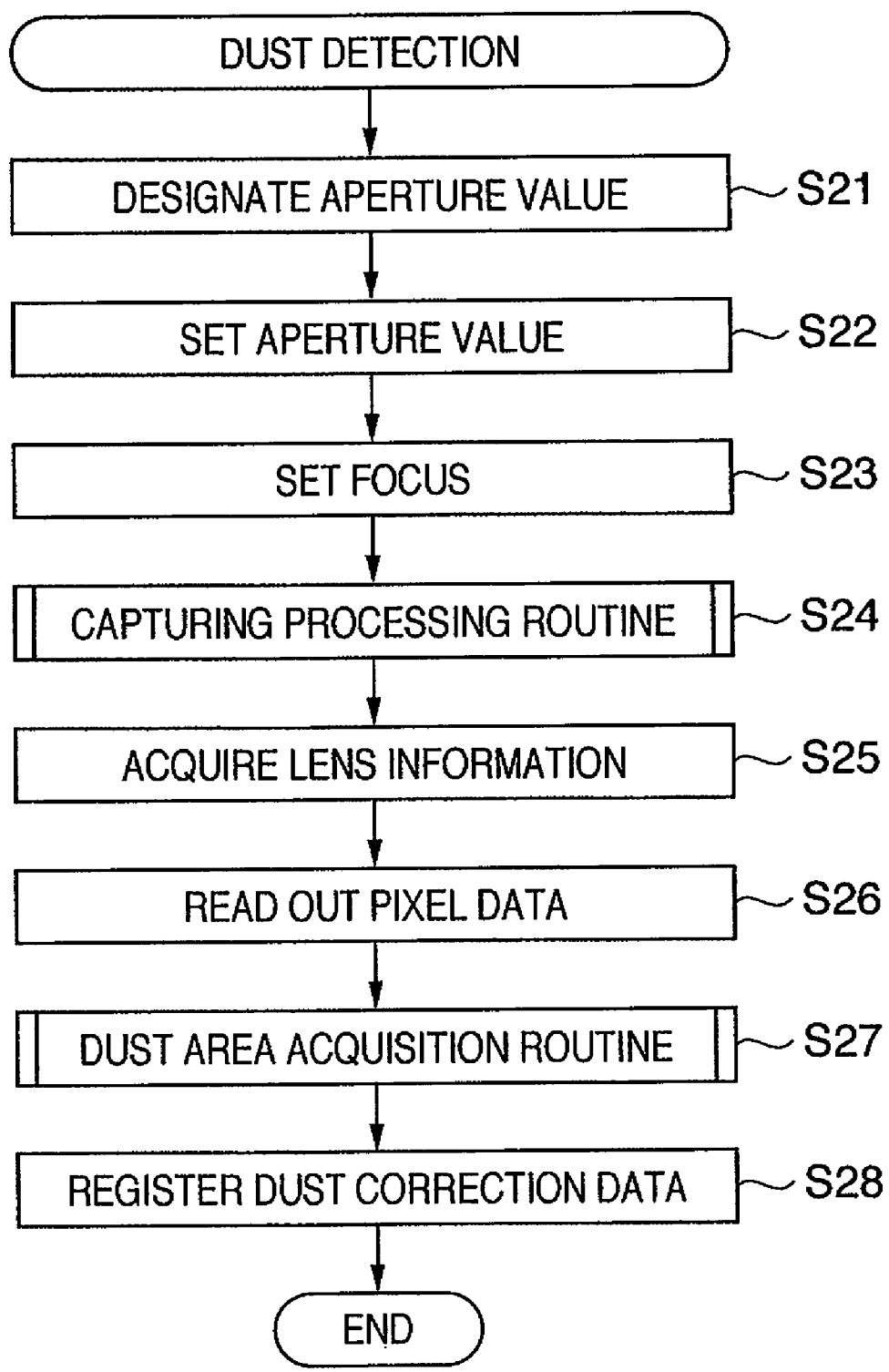
FIG. 14 is a flowchart for explaining dust detection processing in the digital camera according to the second embodiment.

FIG. 14 is a flowchart for explaining dust detection processing (the process of detecting a pixel position at which an image defect is caused by dust) in the digital camera according to this embodiment. The microcomputer 402 executes this processing by executing the dust detection processing program stored in the memory 428.

Dust detection processing is performed after first capturing a dust detection image. The user places the camera so as to direct the shooting optical axis 201 of the shooting lens 200 to a surface with a uniform color such as the exit surface of a surface light source device or a white wall, and makes preparations for dust detection. Alternatively, the user attaches a light unit for dust detection (a compact point light source to be attached instead of a lens) to the lens mount 202, and makes preparations for dust detection. As the light unit, for example, a white LED can be used. It is preferable to adjust the size of the light-emitting surface to a value equivalent to a predetermined aperture value (e.g., F64 in this embodiment).

This embodiment exemplifies a case in which a general shooting lens is used. However, it suffices to perform dust detection by attaching the above light unit to the lens mount 202 directly. As described above, in this embodiment, a dust detection image is an image having a uniform color.

When the user issues an instruction to start dust detection processing by using, for example, the cross switch 116 upon completion of preparations for the processing, the microcomputer 402 first sets the aperture. The imaged state of dust near the image sensor changes depending on the aperture value of the lens, and the position of the dust image changes depending on the pupil position of the lens. Dust correction data, therefore, needs to include the aperture value and the pupil position of the lens at the time of detection, in addition to the position and size of dust.

If, however, it is determined in advance in the stage of generating the dust correction data that the same aperture value is used regardless whether different lenses are used, it is not always necessary to include the aperture value in the dust correction data. In addition, using a light unit or allowing the use of only a specific lens will eliminate the need to hold any pupil position in the dust correction data. That is, in the stage of generating dust correction data, when the use of a plurality of lenses is permitted or the aperture value to be set is changed as needed, it is necessary to hold an aperture value and the pupil position of a lens at the time of detection in dust correction data. Note that the pupil position in this case indicates the distance from the capturing plane (focal plane) of an exit pupil.

In this embodiment, for example, F16 is designated as the aperture value (step S21).

The microcomputer 402 then causes the lens control circuit 407 to perform aperture blade control on the shooting lens 200 to set the aperture to the aperture value designated in step S21 (step S22). In addition, the microcomputer 402 sets the focus position to infinity (step S23).

When the aperture value and focus position of the shooting lens are set, the microcomputer 402 executes shooing in the dust detection mode (step S24). The details of the shooting processing routine performed in step S24 will be described later with reference to FIG. 19. The image buffer memory 424 stores captured image data.

When the shooting operation is complete, the microcomputer 402 acquires the aperture value and the lens pupil position at the time of shooting (step S25). The image processing circuit 425 reads out data corresponding to each pixel of the shot image stored in the image buffer memory 424 (step S26). The image processing circuit 425 performs the processing shown in FIG. 16 to acquire the position and size of a pixel in which the dust portion exists (step S27). The microcomputer 402 registers, in the dust position memory 427, the position and size of the pixels in which the dust portion exists, which are acquired in step S27, and the aperture value and lens pupil position information acquired in step S25 (step S28). If the above-described light unit is used in this case, no lens information can be acquired. If no lens information can be acquired, therefore, it is determined that the light unit is used, and predetermined lens pupil position information and the equivalent aperture value calculated from the light source diameter of the light unit are registered.

In step S28, the position of each defective pixel (pixel defect) in manufacturing, which is recorded on the pixel defect position memory 426 in advance, is compared with the position of each readout pixel data to check whether a pixel defect is present. The position of areas determined to have a defect other than a pixel defect is then registered in the dust position memory 427.

FIG. 15 shows an example of the data format of dust correction data stored in the dust position memory 427. As shown in FIG. 15, lens information and information representing the position and size of dust at the time of shooting of a detection image are stored as dust correction data. The dust correction data is added to an image together with the information of image data at the time of general shooting and used in dust removal processing to be described later.

More specifically, an actual aperture value (F-number) and lens pupil position at the time of shooting of the dust detection image are stored as lens information at the time of shooting of the dust detection image. The number (integral value) of detected dust areas is stored in the storage area. Then, individual parameters for each dust area are stored. The dust area parameters include a set of three numerical values: the radius (for example, two bytes) of the dust portion, the x-coordinate (for example, two bytes) of the center of the effective image area, and the y-coordinate (for example, two bytes) of said center.

If the dust correction data size is restricted by, for example, the capacity of the dust position memory 427 or the like, data are preferentially stored in chronological order of dust areas obtained in step S27. This is because the dust area acquisition routine in step S27 sorts the dust areas in descending order of noticeability.

(Dust Area Acquisition Routine)

The dust area acquisition routine in step S27 will be described next in detail with reference to FIGS. 16 to 18.

Figure 17:
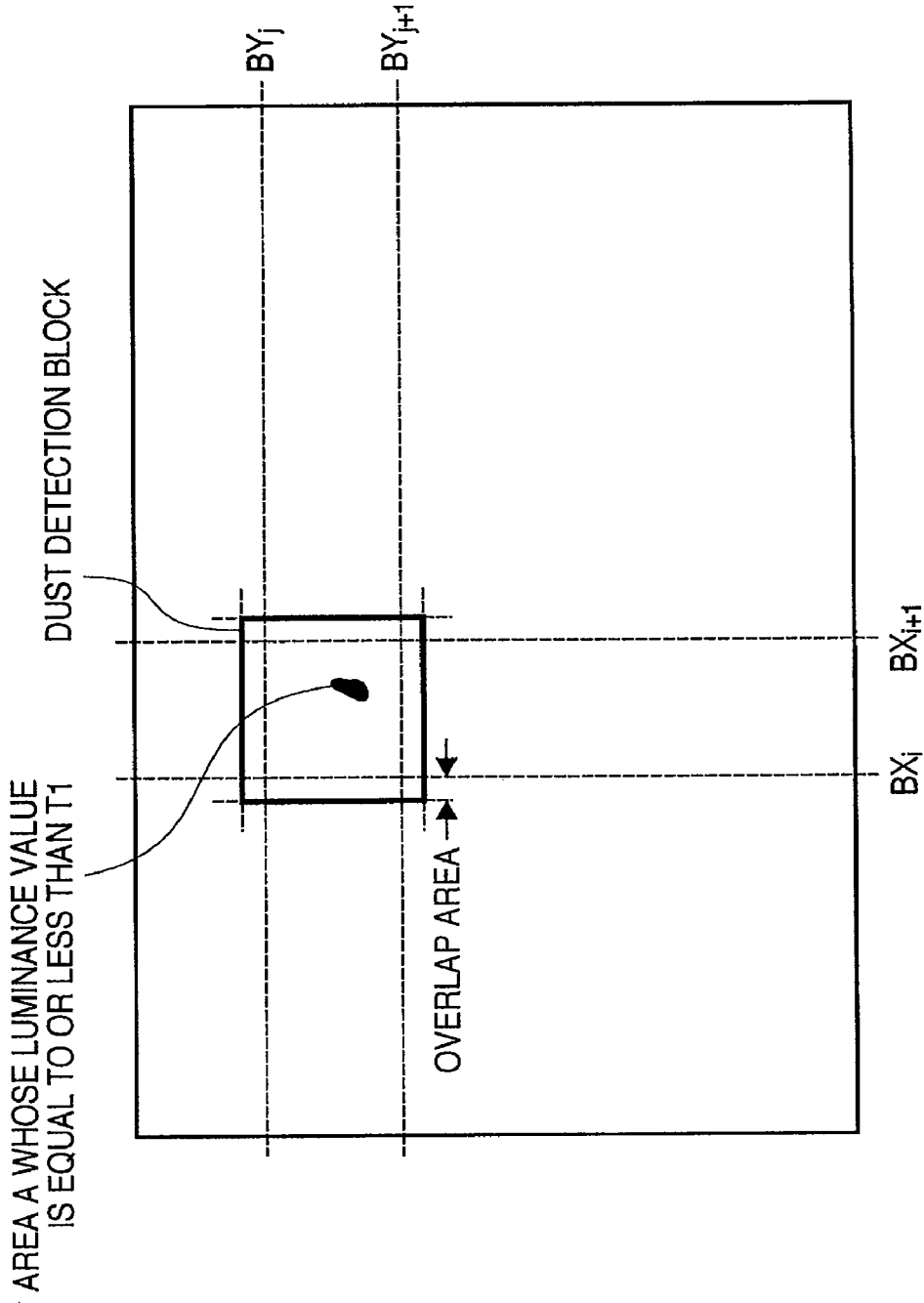
FIG. 17 is a view showing the process unit of dust area determination processing in step S62 in FIG. 16.

As shown in FIG. 17, readout image data is rasterized in the memory, and is processed on a predetermined block basis. Such processing is performed to cope with limb darkening due to the lens or sensor characteristic. Limb darkening is a phenomenon in which the luminance of the peripheral portion of a lens is lower than that of the central portion. It is known that limb darkening can be reduced to some degree by stopping down the lens. Even in the stopped down state, however, it is impossible for some lenses to accurately detect dust at the peripheral portion if the dust position is determined on the basis of a threshold value predetermined for a shot image. To prevent this, the influence of limb darkening is reduced by segmenting image data into blocks.

Simple block segmentation poses a problem that if the threshold value changes between blocks, the detection result on the dust portion across the blocks becomes inaccurate. To prevent this, the blocks are overlapped, and a pixel determined as a dust portion in any one of blocks constituting the overlap is handled as a dust area.

Dust area determination in a block is done in accordance with the procedure shown in FIG. 16. First of all, a maximum luminance Lmax and an average luminance Lave in the block are calculated. A threshold value T1 in the block is calculated by $$T1 = Lave \times 0.6 + Lmax \times 0.4$$

A pixel having a luminance which does not exceed the threshold value is regarded as a dust pixel (step S61). Each isolated area formed by dust pixels is defined as one dust area di (i=0, ..., n) (step S62). As shown in FIG. 18, for each dust area, a maximum value Xmax and minimum value Xmin of the horizontal coordinates of the pixels constituting the dust area and a maximum value Ymax and minimum value Ymin of the vertical coordinates are obtained. A radius ri representing the size of the dust area di is calculated by the following equation (step S63).

$$ri = \sqrt{[\{(Xmax-Xmin)/2\}^2 + \{(Ymax-Ymin)/2\}^2]}$$

FIG. 18 shows the relationship between Xmax, Xmin, Ymax, Ymin, and ri.

In step S64, the average luminance value of each dust area is acquired by calculation.

In some cases, the dust correction data size is restricted by, for example, the size of the dust position memory 427. To cope with such a case, the pieces of dust position information are sorted on the basis of the sizes or average luminance values of the dust areas (step S65). In this embodiment, sorting is done in descending order of ri. If ri is the same, sorting is done in ascending order of average luminance values. This allows to preferentially register noticeable dust in the dust correction data. Let Di be a sorted dust area, and Ri be the radius of the dust area Di.

Note that any dust area larger than a predetermined size can be excluded from the sorting targets and placed at the end of the sorted dust area list. A large dust area may degrade the image quality by interpolation processing later and is therefore preferably handled as a correction target with the lowest priority.

(Capturing Processing Routine)

Figure 19:
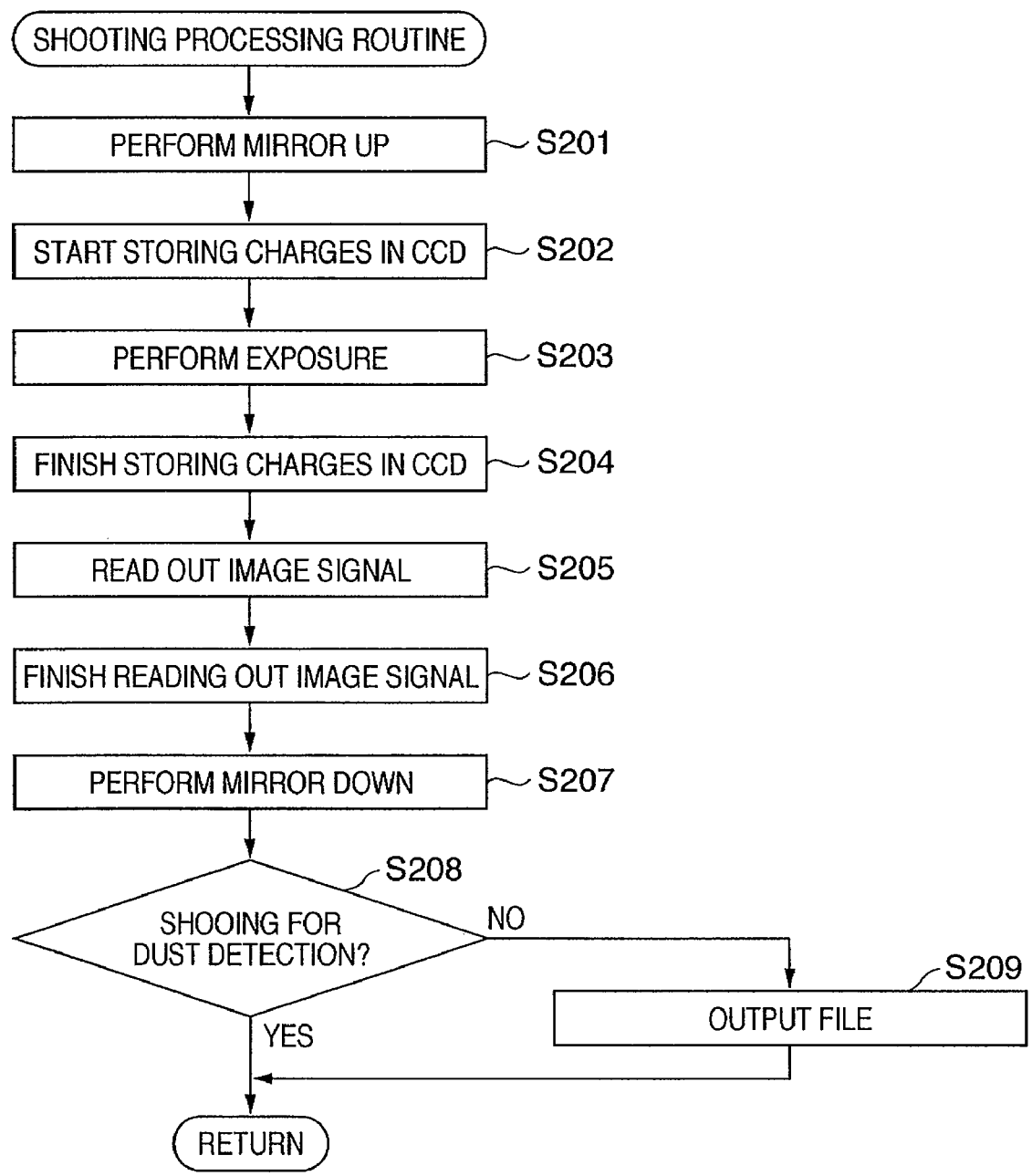
FIG. 19 is a flowchart for explaining details of a shooting processing routine in step S24 in FIG. 14.

The capturing processing routine in step S24 in FIG. 14 will be described next with reference to the flowchart shown in FIG. 19. The microcomputer 402 executes this processing by executing a capturing processing program stored in the memory 428.

When the capturing processing routine starts, the microcomputer 402 actuates the quick return mirror 203 shown in FIG. 13 to perform so-called mirror up in step S201 and make the quick return mirror 203 retreat from the shooting optical path.

In step S202, the image sensor starts storing charges. In step S203, the front curtain 210 and rear curtain 209 of the shutter shown in FIG. 13 run to execute exposure. In step S204, the image sensor finishes storing charges. In step S205, the image signal is read out from the image sensor and is processed by the A/D converter 423 and the image processing circuit 425. The resultant image data is primarily stored in the image buffer memory 424.

When the readout of all image signals from the image sensor is complete in step S206, the microcomputer 402 in step S207 returns the mirror to the mirror down position, thereby terminating the series of capturing operations.

In step S208, the microcomputer 402 determines whether the operation is a general shooting operation or a dust detection image shooting operation. At the time of a general shooting operation, the process advances to step S209 to record, on the recording device 419, the dust correction data shown in FIG. 15 together with the camera setting values at the time of shooting operation in association with the image data.

More specifically, data association can be implemented by additionally writing the dust correction data in, for example, an Exif area which is the header area of an image file on which the camera setting values at the time of a shooting operation are recorded. Data association can also be achieved by recording the dust correction data as an independent file and recording, in the image data, only link information to the dust correction data file. However, if the image file and dust correction data file are separately recorded, the link relationship may be lost at the time of movement of an image file. Therefore, the dust correction data is preferably held integrally with the image data.

(Dust Removable Processing)

The procedure of dust removal processing will be described next. Dust removal processing is performed not in the camera body, but on a separately prepared image processing apparatus.

FIG. 1 schematically shows the system configuration of the image processing apparatus.

The arrangement of the image processing apparatus shown in FIG. 1 has been described in the first embodiment, and hence a repetitive description will be omitted.

The image processing apparatus in this embodiment can execute two processes as image editing functions. One is a copy stamp process, and the other is a repair process. The copy stamp process is a function of combining some of the areas on a designated image with another area which is separately designated. The repair process is a function of detecting an isolated area in the captured image which matches a predetermined condition, and interpolating pixel data values in the isolated area with data values from neighboring pixels.

In addition, this apparatus has an automatic repair function of automatically executing a repair process (dust removal processing) for designated coordinates by using dust correction data attached to image data in the digital camera body.

These processes will be described in detail later.

FIG. 2 is a view showing a GUI (Graphical User Interface) of an image editing program in the image processing apparatus. A window has a close button 1100 and a title bar 1101. When the user presses the close button 1100, the program ends. A file is dragged and dropped onto an image display area 1102 to designate a correction target image. When the correction target image is determined, the file name is displayed on the title bar 1101, and the target image is Fit-displayed in the image display area 1102.

The editing target image is displayed in two states, i.e., a Fit-displayed state and a pixel one-to-one displayed state. Operating a display mode button 1108 can switch these displayed states. According to this GUI, a process position is designated by clicking on an image. In the Fit displayed state, coordinates on a processed image which correspond to a position identified by a user—for example by clicking a button on a mouse—are calculated in accordance with a display magnification, and the process is applied to the calculated coordinates. According to this GUI, a processing range is designated by a radius. This radius is one on the editing target image, and sometimes differs from a radius on a Fit-displayed image depending on the display magnification.

When the user presses an automatic repair button 1103, automatic dust removal processing (to be described later) is executed. The processed image is then displayed on the image display area 1102. The automatic repair button 1103 becomes valid only when an image has not been edited. The automatic repair button 1103 becomes invalid after an image is edited upon execution of a copy stamp process, repair process, and automatic repair process.

A radius slider 1106 is a slider which designates application ranges for a copy stamp process and a repair process.

When the user presses a repair process mode button 1104, the repair process starts. When the user left-clicks a portion in the image in the repair process mode, a repair process (to be described later) is applied to an area having the left-clicked coordinates as a center and the number of pixels designated by the radius slider 1106 as a radius. After the application of the repair process, the process leaves the repair process mode.

When the user right-clicks on the image display area 1102 in the repair mode or presses any button on the GUI, the process leaves the repair mode.

When the user presses a copy stamp process mode button 1105, the copy stamp mode starts. When the user left-clicks a portion in an image in the copy stamp mode, the left-clicked coordinates are set as the central coordinates of a copy source area. When the user further left-clicks on the image while the central coordinates of the copy source area are set, a copy stamp process is executed with the left-clicked coordinates being the central coordinates of the copy destination area and the radius designated by the radius slider 1106 at this time being a copy radius. The process then leaves the copy stamp mode while the central coordinates of a copy source area are kept unset. When the user right-clicks on the image display area 1102 in the copy stamp mode or presses any button on the GUI, the process leaves the copy stamp mode while the central coordinates of the copy source area are kept unset.

When the user presses a save button 1107, the processed image is saved.

This image-editing program holds both a source image and an image after a process, as shown in FIG. 3. The editing process designated by the GUI is applied to the processed image, and the applied editing process is registered in an editing history. One editing process registered in the editing history will be referred to as an editing entry. FIG. 4 shows an example of an editing entry. An editing entry in this embodiment holds a process ID for discriminating a copy stamp process from a repair process, a center and radius which indicate a process application area, relative coordinates from copy source coordinates to copy destination coordinates which are necessary for a copy stamp process, and difference image data to be described later. When an automatic repair process is executed, a repair process is executed in accordance with dust correction data. Every time a repair process is applied, an editing entry is added to the editing history.

Such implementation makes it possible to reconstruct a source image upon completely discarding an editing history or cancel an immediately preceding editing process.

For example, it is possible to implement the processing of canceling an immediately preceding editing process by temporarily overwriting a processed image with a source image and then re-executing the editing process up to an editing entry as a cancellation target. If, however, the number of entries is very large, it may take much time to re-execute the editing process. For this reason, every time editing operation is executed, the difference between image data before and after the execution of an editing process is held in an editing entry. Holding a difference image allows the apparatus to only reflect the difference image corresponding to the editing entry as a cancellation target in place of the re-execution of the editing process written in an editing entry from the beginning.

The details of a repair process and automatic repair process will be described next. A copy stamp process is a known technique, and hence a detailed description of this process will be omitted.

A repair process is the process of detecting an isolated area in designated areas and interpolating the pixel values in the isolated area. The repair process is implemented by applying an interpolation routine (to be described later) to the area expressed by the central coordinates and radius designated with the GUI.

Figure 20:
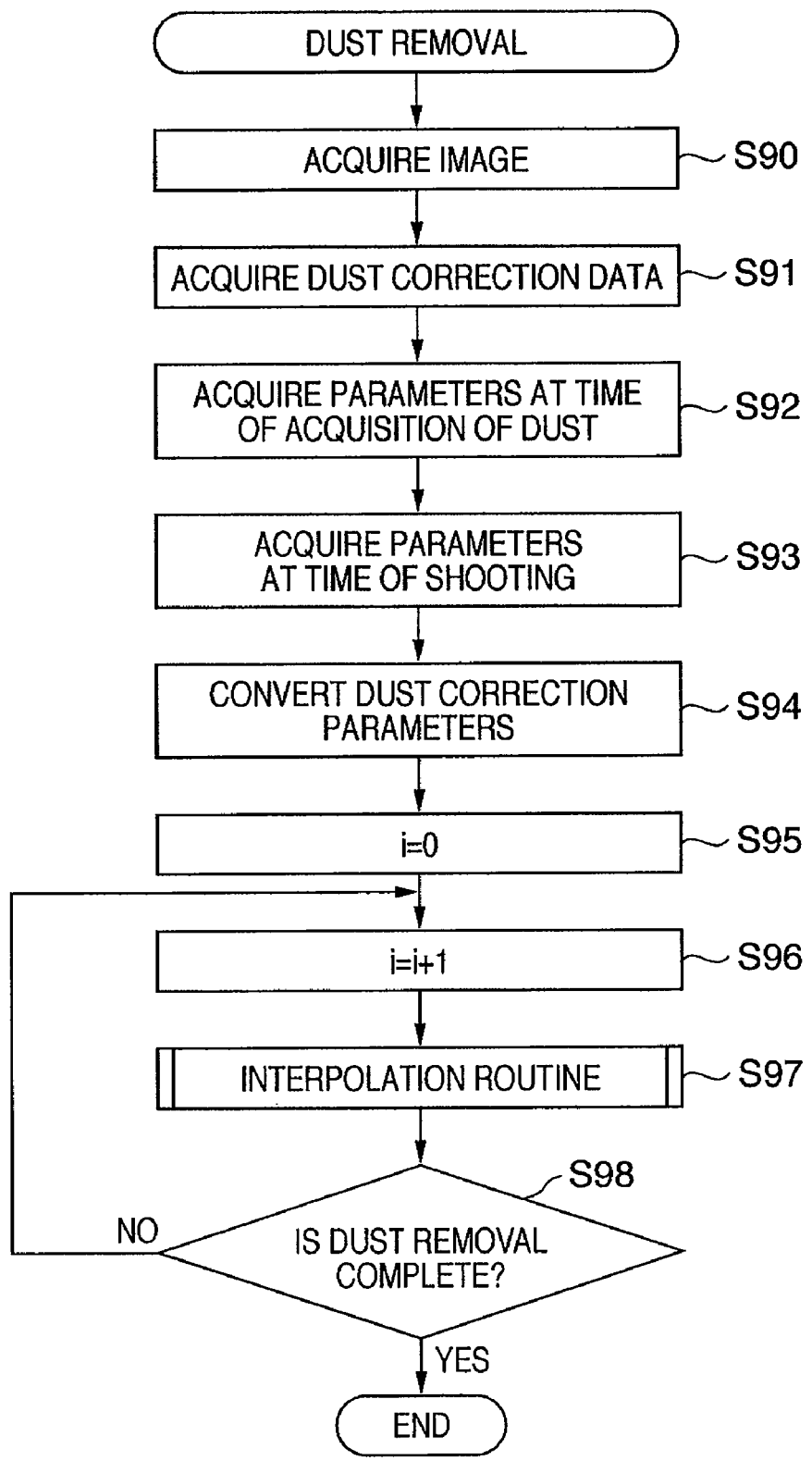
FIG. 20 is a flowchart for explaining the basic sequence of an automatic repair process.

In an automatic repair process, dust correction data is extracted from general shot image data, and a repair process is automatically executed in accordance with the dust correction data. FIG. 20 shows the basic procedure of an automatic repair process.

The image processing apparatus reads out general shot image data with dust correction data from the digital camera (or the recording device 419 detached from the digital camera) and stores the data in the primary storage unit 1002 or secondary storage unit 1003 (step S90).

The apparatus then extracts the dust correction data added to the shot image in step S209 from the general shot image data (dust removal processing target image) (step S91).

The apparatus obtains a coordinate sequence Di (i=1, 2, ..., n), a radius sequence Ri (i=1, 2, ..., n), an aperture value f1, and a lens pupil position L1 from the dust correction data extracted in step S91 (step S92). In this case, Ri represents the size of dust at the coordinates Di calculated in step S65 in FIG. 16. In step S93, the apparatus acquires an aperture value f2 and a lens pupil position L2 at the time of general shooting of an image. In step S94, the apparatus converts Di by the following expression, where d is the distance from the image center to the coordinates Di, H is the distance between the dust and the surface of the image sensor 418. Coordinates Di' after conversion and a radius Ri' after conversion are defined by, for example, $$Di'(x, y) = (L2 \times (L1-H) \times d / ((L2-H) \times L1)) \times Di(x, y)$$

$$Ri' = (Ri \times f1/f2 + 3) \times 2 \quad (1)$$

In this case, the units are pixels, and "+3" for Ri' is the margin amount. (Ri×f1/f2+3) is doubled because an area outside the dust area is necessary for detecting the dust area by using the average luminance.

In step S95, the apparatus initializes an interpolation processing count i to 0, and counts up the counter i in step S96.

In step S97, the apparatus executes an interpolation routine for the area represented by the ith coordinates Di' and the radius Ri' to remove the dust portion in the area. In step S98, the apparatus determines whether dust removal processing is applied to all coordinates. If YES in step S98, the apparatus terminates the processing. If No in step S98, the process returns to step S96.

It is known that as the F-number at the time of shooting decreases (approaches the open F-number), the dust image blurs more and becomes less noticeable. It is therefore conceivable to eliminate the need to perform all repair processes when the F-number at the time of shooting is referred to before the execution of an automatic repair process and the referred value is less than a threshold. This makes it possible to omit an analysis process and efficiently perform processing even if there are many editing target images. In this embodiment, for example, when the aperture value is less than F8, the automatic repair process is skipped.

Figure 21:
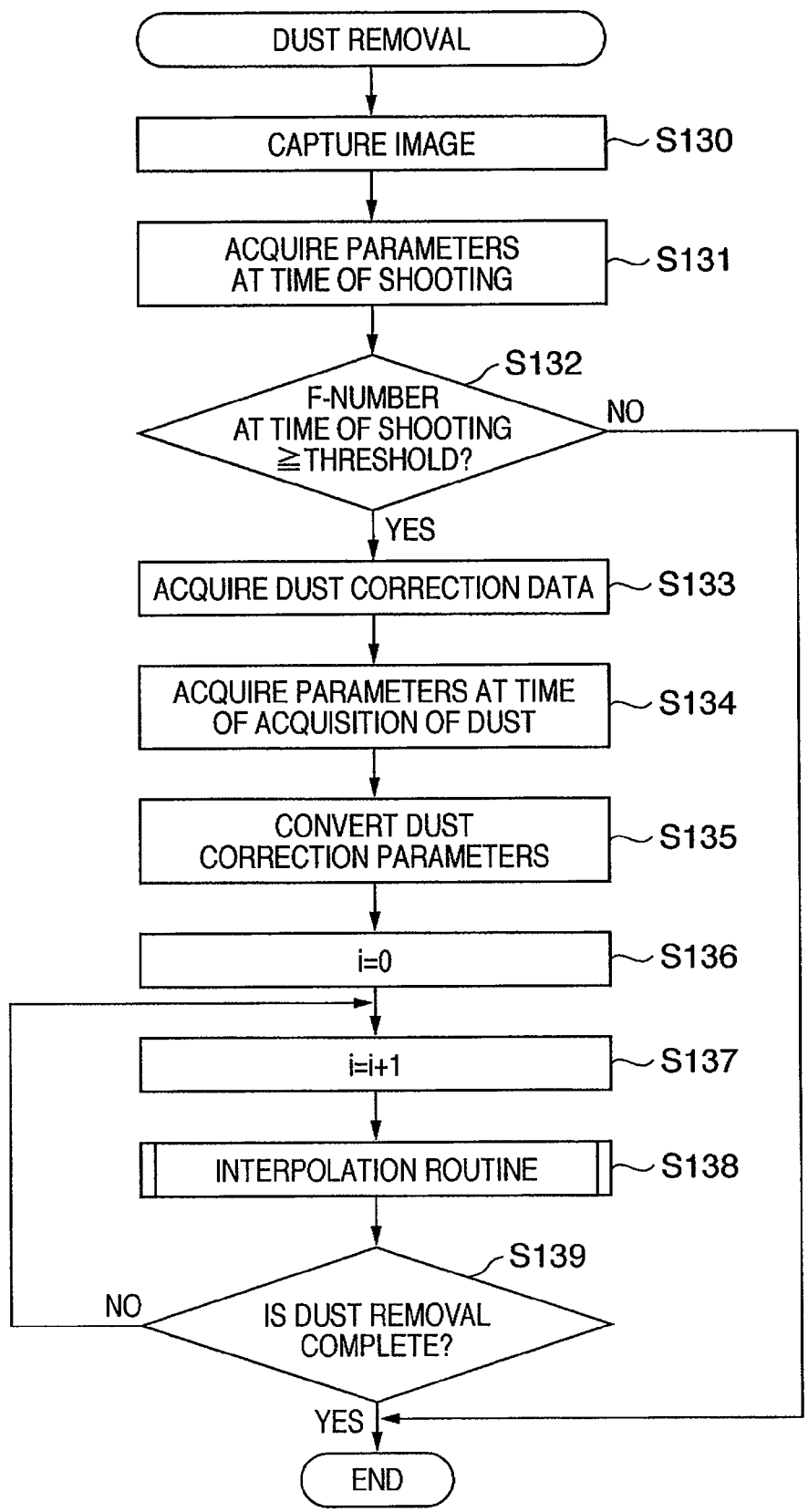
FIG. 21 is a flowchart for explaining the sequence of a modification of the automatic repair process in FIG. 20.

FIG. 21 shows the procedure of an automatic repair process modified in this manner.

This processing is the same as that shown in FIG. 20 except that parameters at the time of shooting are acquired before all processes, and the acquired parameters are compared with a threshold in step S132.

(Interpolation Routine)

An interpolation routine executed in a repair process and automatic repair process will now be described.

FIG. 5 is a flowchart showing the procedure of the interpolation routine. First of all, in step S1201, dust area (defective area) determination is performed. In this case, let P be the central coordinates of an area as a repair process target, and R be the radius of the area. A dust area is an area that satisfies all the following conditions.

(1) An area having a luminance lower than a threshold value T2 which is obtained by $$T2 = Yave \times 0.6 + Ymax \times 0.4$$

where Yave is the average luminance of pixels included in a repair process target area, and Ymax is the maximum luminance of the pixels.

(2) An area that does not contact the circle represented by the central coordinates P and the radius R.

(3) An area whose radius value calculated by the same method as that in step S63 in FIG. 16 is x pixels or more and less than y pixels in the isolated area constituted by low-luminance pixels selected in (1).

At the time of an automatic repair process, an area that satisfies the following condition in addition to the above conditions is set as a dust area.

(4) An area including the central coordinates P of the circle.

In this embodiment, x is three pixels, and y is 30 pixels. This permits only an isolated small area to be handled as a dust area.

If it is determined in step S1202 that such an area exists, the process advances to step S1203 to execute dust area interpolation. If no area exists, the processing is terminated. The dust area interpolation processing in step S1203 is executed by a known defective area interpolation method. An example of the known defective area interpolation method is pattern replacement disclosed in Japanese Patent Laid-Open No. 2001-223894. The method disclosed in Japanese Patent Laid-Open No. 2001-223894 specifies a defective area by using infrared light. In this embodiment, the dust area detected in step S1201 is handled as a defective area, and pattern replacement is executed to interpolate the dust area from normal neighboring pixels. A pixel that cannot be compensated for by pattern replacement is interpolated by selecting p normal pixels in ascending order of distance from the interpolation target pixel in the image data interpolated by pattern replacement and q normal pixels in descending order of distance, and using the average color of the selected pixels.

Figure 22:
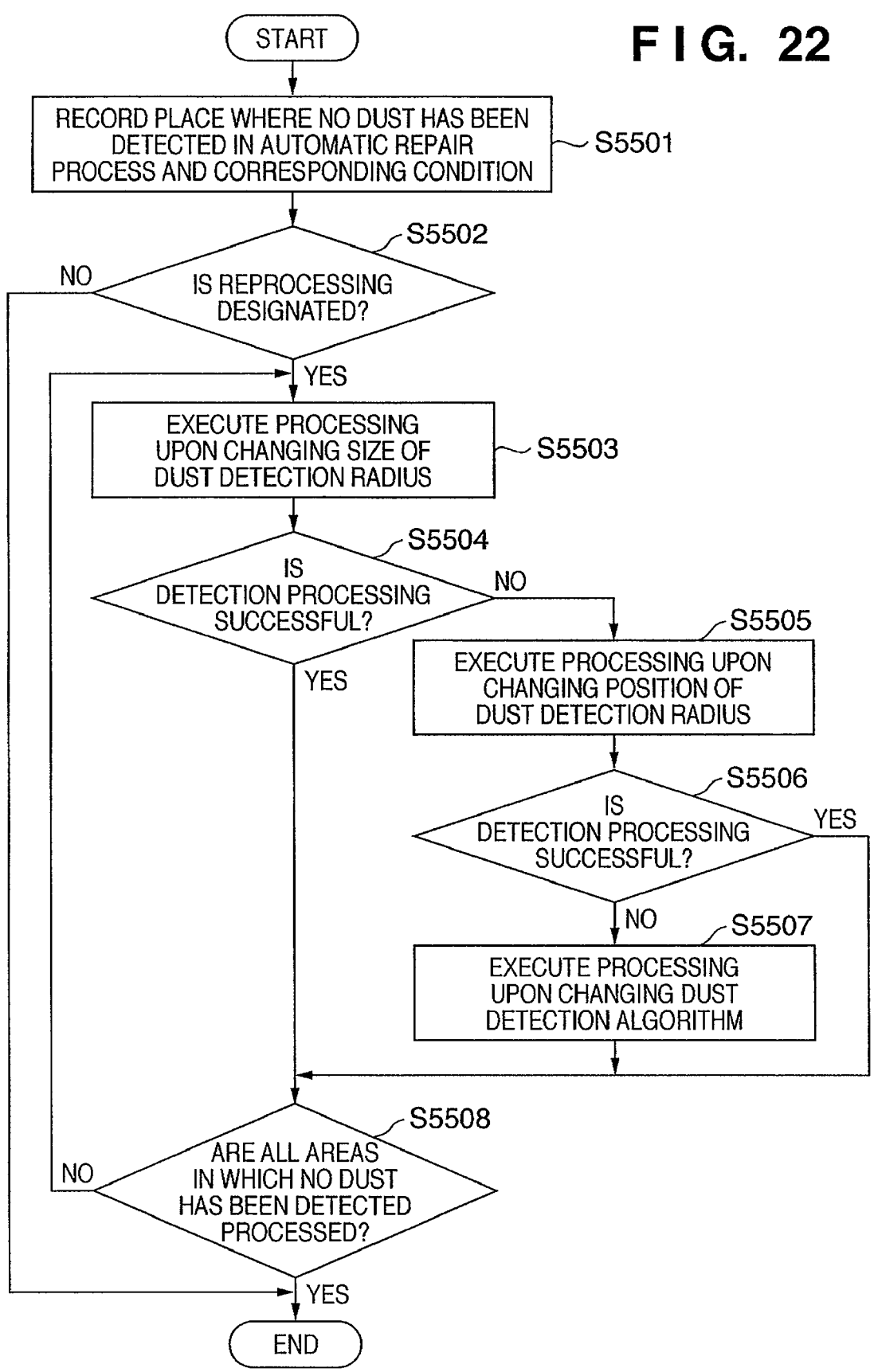
FIG. 22 is a flowchart showing a reprocessing sequence for a portion where no dust is detected by the automatic repair process.

The processing to be executed when it is determined in step S1202 that there is no dust area will be described with reference to the flowchart of FIG. 22.

In step S5501, in an automatic repair process, a place where there is no isolated small area and the conditions under which no dust has been detected are recorded.

In this case, the conditions under which there is no isolated small area is present include the following:

(1) Dust is in contact with the dust detection radius.

(2) There is no area darker than the threshold value T2 within the dust detection radius.

In addition, conditions under which dust has been detected include the number of dust areas and the like. These conditions are recorded.

If it is determined in step S5502 that there are one or more positions at which no dust area is present, and the user designates an automatic repair process re-execution after the execution of the automatic repair process, the following processing is executed. It is determined that no dust area has been detected but the user eagerly wants to remove dust at the position, and the process advances to step S5503.

More specifically, if there are one or more positions at which it is determined that no dust area is present after the execution of an automatic repair process upon, for example, pressing of the automatic repair button (first designation means) 1103 in FIG. 2, the following processing is performed. When the character string displayed on the automatic repair button 1103 is changed to "automatic reprocess" or the like to allow the user to press it (second designation means), and the user presses the automatic repair button 1103 again, the apparatus performs an automatic repair reprocess. The apparatus can include a reprocess designation button in addition to the automatic repair button 1103 instead of changing the character string to indicate the button as a button for a reprocess. In addition, in order to notify the user of the position of dust at which a reprocess is to be performed before the execution of the reprocess, the apparatus can display all dust areas for which no process has been performed on the image display area 1102 when the user simply places the mouse cursor on a button.

If the user does not designate a reprocess, the processing is terminated.

In step S5503, the apparatus starts processing from the position of the uppermost leftmost dust area which has not been detected. First of all, the apparatus executes the processing upon changing the size of the dust detection radius. A method of changing the dust detection radius is the same as that in the processing shown in FIG. 7 in the first embodiment, and hence a repetitive description will be omitted.

If it is determined in step S5504 that the detection processing is successful, the process advances to step S5508. If the processing fails, the process advances to step S5505 to change the central position of the dust detection radius and execute the processing.

Figure 8:
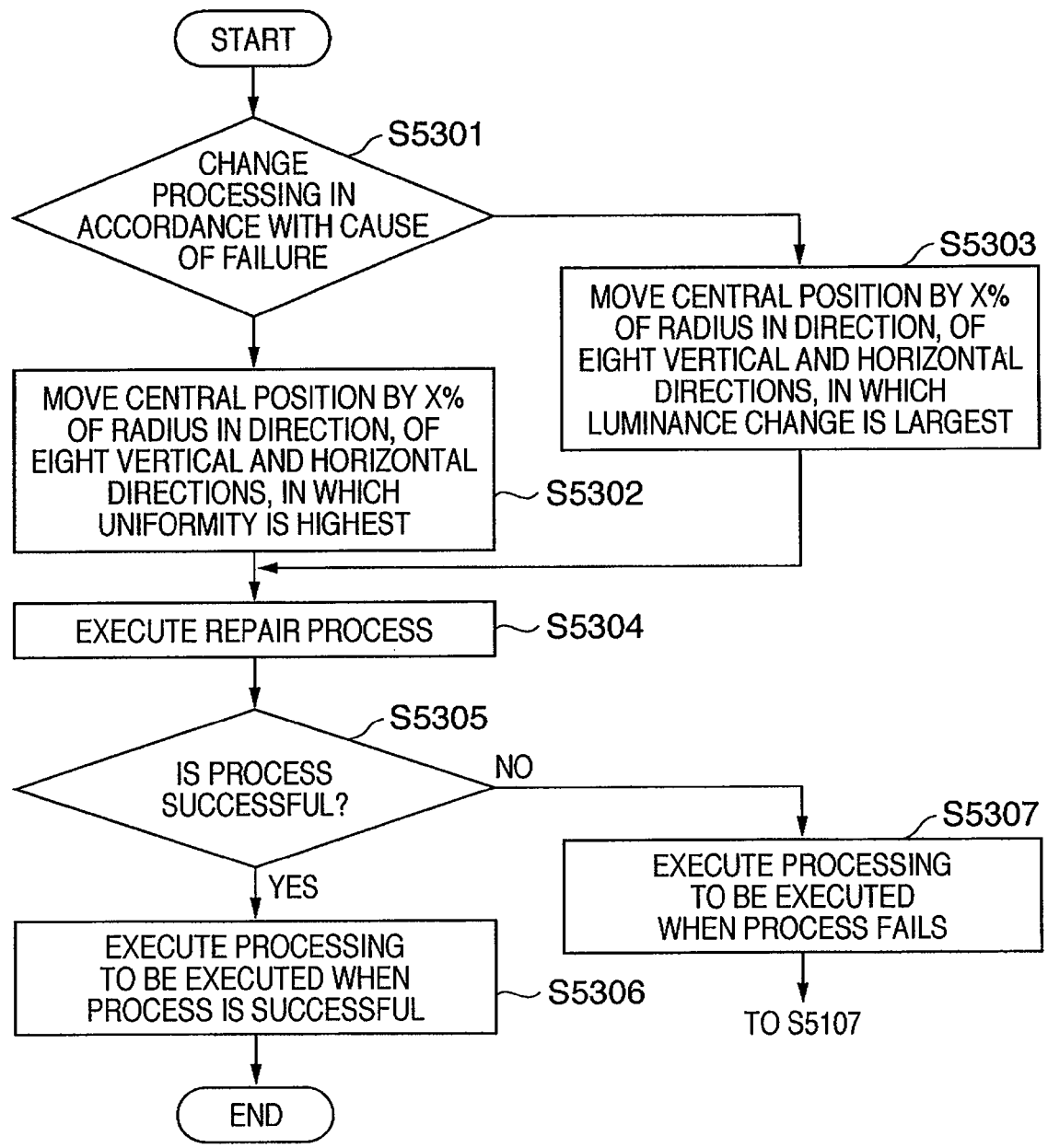
FIG. 8 is a flowchart showing a processing sequence for changing the central position of a dust detection radius in the first embodiment.

A method of changing the central position of the dust detection radius is the same as that in the processing shown in FIG. 8 in the first embodiment, and hence a repetitive description will be omitted.

If it is determined in step S5506 that the detection processing is successful, the process advances to step S5508. If the processing fails, the process advances to step S5507.

In step S5507, the apparatus changes the dust detection algorithm and detects a given position inside the dust detection area as a dust position. The process then advances to step S5508.

Figure 9:
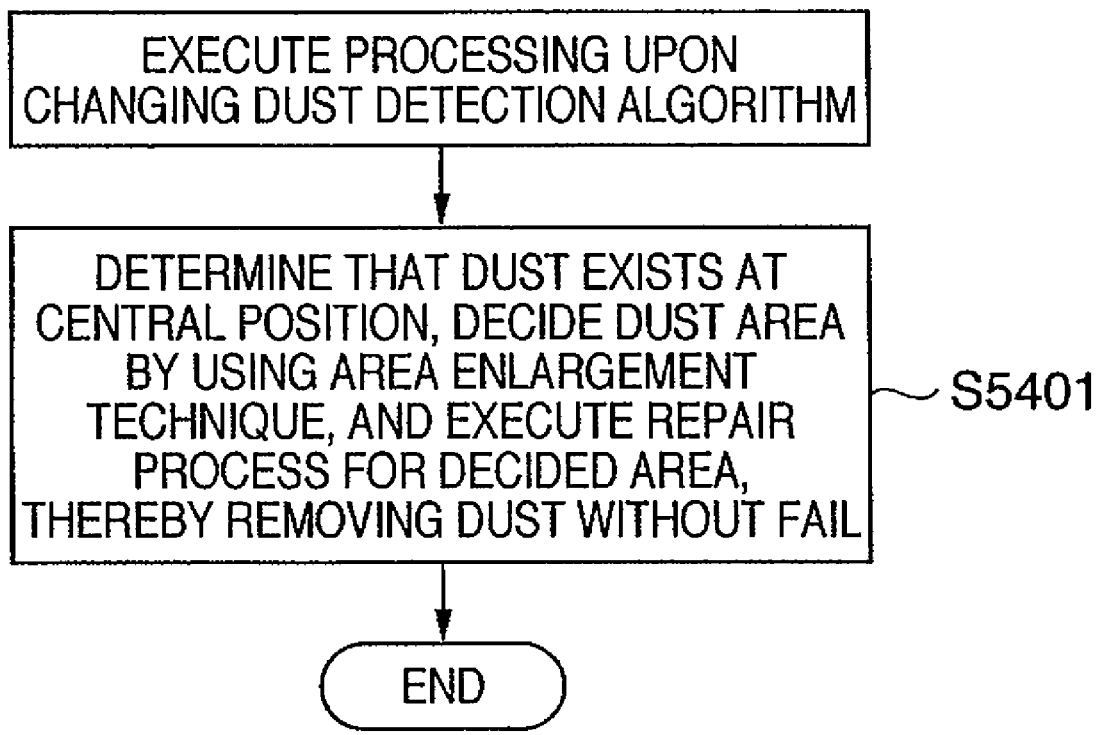
FIG. 9 is a flowchart showing a processing sequence for changing a dust detection algorithm in the first embodiment.

A method of changing the dust detection algorithm is the same as that in the processing shown in FIG. 9 in the first embodiment, and hence a repetitive description will be omitted.

It is determined in step S5508 whether all the areas in which no dust has been able to be detected have been processed. If NO in step S5508, the process returns to step S5503 to process an unprocessed area. If YES in step S5508, the processing is terminated.

With the above method, even dust for which detection has failed once in an automatic repair process can be removed by performing a repair process by changing the parameters and the algorithm.

In the above automatic repair process, it is simply determined from the F-number at the time of shooting whether to apply processing, as indicated by step S132 in FIG. 21. In practice, however, the larger the dust, the more noticeable it is, and hence it suffices to determine from a combination of the F-number and the size of dust whether to apply processing. Alternatively, the apparatus can calculate the luminance difference between a dust area and a surrounding area at the time of detection and store the difference in dust correction data, and can use it for execution determination processing for the interpolation routine. For example, the following method is conceivable. Thin dust may not be noticeable when the aperture value is close to the open F-number. In this case, therefore, the processing is skipped.

In this embodiment, when detection fails after the size of the dust detection radius is changed first, the central position of the dust detection radius is changed. Lastly, the processing algorithm is changed, and processing is performed. However, the size and position of the dust detection radius can be changed in the reverse order to the above, as an alternative.

In this embodiment, the size of the dust detection radius is changed only once. However, when the size and central position of the dust detection radius are to be changed, the size and central position of the dust detection radius can be determined by repeating the processing several times. In this case, the processing is repeated within the range set by determining the number of times of repetitions, the minimum and maximum values of the dust detection radius, or the maximum movement amount, or the like.

In addition, the size and central position of the dust detection radius can be changed in a random fashion. In this case, the processing is repeated within the range set by determining the number of times of repetitions or the like.

Other Embodiments

The invention may also be achieved by the following method. A storage medium (or recording medium) which records software program codes to implement the functions of the above embodiments is supplied to a system or apparatus. The computer (or CPU or MPU) of the system or apparatus reads out and executes the program codes stored in the storage medium. In this case, the program codes read out from the storage medium themselves implement the functions of the above embodiments. The store medium storing the program codes constitutes the present invention. The functions of the above embodiments are implemented not only when the readout program codes are executed by the computer but also when the operating system (OS) running on the computer performs part or all of actual processing on the basis of the instructions of the program codes.

The present invention also includes the case where the program codes read out from the storage medium are written in the memory of a function expansion board inserted into the computer or a function expansion unit connected to the computer. The CPU of the function expansion board or function expansion unit then performs part or all of actual processing on the basis of the instructions of the program codes, thereby implementing the above embodiments.

When the present invention is applied to the above storage medium, the storage medium stores program codes corresponding to the procedures described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-099746, filed Apr. 5, 2007 which is hereby incorporated by reference herein in its entirety.

What is claimed is:

1. An image processing apparatus for correcting an image captured by an image capturing apparatus including an image sensor having a plurality of pixels arrayed two-dimensionally and on which a shadow of a foreign substance adhering to an optical element placed in front of the image sensor is captured, so as to reduce an influence of the shadow of the foreign substance, comprising:

an interpolation unit configured to interpolate a signal of a pixel corresponding to the shadow of the foreign substance on a captured image from a signal of a neighboring pixel outside the shadow of the foreign substance;

a designation unit configured to input an instruction to cause said interpolation unit to perform the interpolation; and a control unit configured to control said interpolation unit to perform the interpolation in accordance with an instruction input from said designation unit, to accept a re-execution instruction input from said designation unit if said interpolation unit is unable to perform the interpolation, and to cause said interpolation unit to re-execute the interpolation with changing a parameter for the interpolation or an algorithm for the interpolation.

2. The apparatus according to claim 1, wherein said designation unit provides different indications between a case in which an instruction to perform the interpolation is to be input first and a case in which the re-execution instruction is to be input.

3. The apparatus according to claim 1, wherein said designation unit includes a first designation unit for inputting an instruction to perform the interpolation first, and a second designation unit for inputting the re-execution instruction.

4. The apparatus according to claim 1, further comprising:
   a position designation unit configured to designate an arbitrary position on the captured image; and
   a size designation unit configured to designate a size of an area for the interpolation,
   wherein said control unit controls said interpolation unit to execute the interpolation, in accordance with an instruction input from said designation unit, on the basis of a position and a size designated by said position designation unit and said size designation unit, and controls said interpolation unit, upon acceptance of the re-execution instruction, to re-execute the interpolation with changing at least one of the position and the size.

5. The apparatus according to claim 1, wherein
   the apparatus stores information about at least a position and a size of the shadow of the foreign substance in association with the captured image, and
   said control unit controls said interpolation unit to execute the interpolation, in accordance with an instruction input from said designation unit, on the basis of the position and the size represented by the information, and causes said interpolation unit, upon input of the re-execution instruction, to re-execute the interpolation processing with changing at least one of the position and the size.

6. A method of controlling an image processing apparatus which corrects an image captured by an image capturing apparatus including an image sensor having a plurality of pixels arrayed two-dimensionally and on which a shadow of a foreign substance adhering to an optical element placed in front of the image sensor is captured, so as to reduce an influence of the shadow of the foreign substance, and includes interpolation unit configured to interpolate a signal of a pixel corresponding to the shadow of the foreign substance on a captured image from a signal of a neighboring pixel outside the shadow of the foreign substance, and designation unit configured to input an instruction to cause the interpolation unit to perform the interpolation, the method comprising:
   a step of causing the interpolation unit to perform the interpolation in accordance with an instruction input from the designation unit, accepting re-execution instruction input from the designation unit if the interpolation unit is unable to perform the interpolation, and causing the interpolation unit, upon acceptance of the re-execution instruction, to re-execute the interpolation with changing a parameter for the interpolation or an algorithm for the interpolation.

\* \* \* \* \*